DETECTION APPARATUS

Original Filed Oct. 7, 1958 4 Sheets-Sheet 1

INVENTOR
Wilfred Roth
BY
Pennie Edmonds Morton Barrows & Taylor
ATTORNEYS

DETECTION APPARATUS

Original Filed Oct. 7, 1958 4 Sheets-Sheet 2

INVENTOR
Wilfred Roth
BY
Pierce Edmunds Morton Beaver Taylor
ATTORNEYS

DETECTION APPARATUS

Original Filed Oct. 7, 1958 4 Sheets-Sheet 3

INVENTOR
Wilfred Roth
BY
Pennie Edmonds Morton Barrows & Taylor
ATTORNEYS

DETECTION APPARATUS

Original Filed Oct. 7, 1958 4 Sheets-Sheet 1

INVENTOR
Wilfred Roth
BY Dennis Edmonds
Miles Bennett Taylor
ATTORNEYS

United States Patent Office

Re. 27,786
Reissued Oct. 16, 1973

27,786
DETECTION APPARATUS

Wilfred Roth, 185 S. Cove Road,
Burlington, Vt. 05401

Original No. 3,065,455, dated Nov. 20, 1962, Ser. No. 765,855, Oct. 7, 1958. Application for reissue Nov. 23, 1970, Ser. No. 92,335
Int. Cl. G08b *13/16*
U.S. Cl. 340—3 E 22 Claims

Matter enclosed in heavy brackets [ ] appears in the original patent but forms no part of this reissue specification; matter printed in italics indicates the additions made by reissue.

*ABSTRACT OF THE DISCLOSURE*

*Ultrasonic detection apparatus for detecting the presence or absence of an object which comprises spaced ultrasonic transmitting and receiving transducers connected with an amplifier to form a regenerative feedback loop adapted to produce continuous-wave oscillations when the path between the spaced transducers is in an acoustically transmitting condition, said continuous-wave oscillations ceasing when the path is in its nonacoustically transmitting condition, and means connected to the amplifier to indicate the presence or absence of said oscillations. The transducers and amplifier have a relatively narrow passband for the regenerative loop oscillations, the amplifier gain and said narrow passband being correlated to maintain a closed loop power gain of at least unity throughout a variation of c/L which produces at least two consecutive one-wavelength changes in the number of acoustic wavelengths between the transducers when the path therebetween is in its acoustically transmitting condition, where c is the velocity of propagation of the ultrasonic energy and L is the path length between the transducers.*

This invention relates to ultrasonic detection apparatus, particularly for detecting objects in the path of an ultrasonic beam propagating from transmitting to receiving transducers.

Various types of apparatus have been used for the detection of objects, including radar-type systems employing electromagnetic radiation, photoelectric cell systems employing a light source, and ultrasonic systems. The latter type systems commonly employ an electronic oscillator energizing a transmitting transducer, with a receiving transducer positioned to receive the transmitted energy and actuating an alarm, etc. when an interfering object in the transmitted beam sufficiently reduces the received energy. Ultrasonic transducers commonly have very sharp resonance curves. Thus, frequency drift in the transducers, oscillator and other elements of the foregoing system, due to temperature variations and other factors, may render the system inoperative. Consequently, relatively complicated and expensive equipment is required to assure operation under varying conditions encountered in practice.

In accordance with the present invention, simple and reliable apparatus is provided which automatically accommodates itself to varying conditions of operation. To this end ultrasonic receiving and transmitting transducers are employed, and the output of the receiving transducer is amplified and fed back to the transmitting transducer so as to form a regenerative loop which produces oscillations when an acoustic transmission path is present between the transducers. When the acoustic transmission path is not present, oscillations cease. For example, in one arrangement the transmitting and receiving transducers are arranged so that, in the absence of an interfering object, regenerative oscillations take place. Then, when an interfering object interrupts the acoustic transmission path, the oscillations cease. By the use of regenerative oscillations, separate oscillators and problems associated with change in frequency thereof are avoided.

To produce and maintain oscillations, it is necessary that the available amplifier power gain be sufficient to give a closed loop power gain of unity under all operating conditions when the acoustic transmission path is established. That is, the power gain in the amplifier must be sufficient to make up for the losses in the transducers and acoustic medium through which the ultrasonic waves propagate, and also losses due to the spreading of the beam from the transmitter.

In order to assure satisfactory operation under a wide variety of conditions, it has been found important to correlate properly the available amplifier gain, the frequency bandwidth of the apparatus, and the phase characteristic over this bandwidth. In a given installation, with fixed separation between the transducers and fixed temperature and other conditions, a certain amplifier gain is required to produce sustained oscillations. However, if the separation between the transducers changes, or if the velocity of propagation in the medium changes due to change of temperature, etc., oscillations will cease unless gain, bandwidth and phase characteristic are chosen properly. Accordingly, an important feature of the present invention is the proper correlation of these factors.

Under certain conditions predominantly traveling wave propagation exists between the transducers, and under these conditions the bandwidth over which the loop gain is equal to unity is of primary importance, changes of phase as operating conditions change entering into the determination of the required bandwidth. Under other conditions predominantly standing wave propagation exists between the transducers, and under these conditions change of phase is of primary importance, in general the loop gain being equal to unity for a change of phase of approximately 180°. Under still other conditions both traveling and standing wave propagation exists, and loop gain related to both bandwidth and change of phase of approximately 180° is important. These and other features of the invention will be discussed more fully hereinafter.

When properly designed and constructed, the apparatus of the invention produces regenerative oscillations under a wide variety of conditions expected to be encountered in a given application. Then, if the acoustic transmission path is interrupted, as by an object intercepting a beam propagating between the transmitting and receiving transducers, the closed loop gain is reduced below the point where oscillations are possible and they cease. Changes in the oscillatory condition at a selected point in the loop may be used for indicating purposes. For example, a change in the loop between oscillatory and non-oscillatory conditions may be used to give an alarm, to actuate a control device, etc. Other indicating arrangements are possible, as will be described hereinafter.

The apparatus of the invention is capable of many diverse uses. One example is a burglar alarm system, wherein the system has the advantage of being inherently fail-safe inasmuch as cutting the closed loop at any point, whether in the electrical path or in the ultrasonic path, results in an alarm. Another example is in the field of automatic door openers, wherein the simplicity and ruggedness of the apparatus is highly advantageous. Further uses are in the field of control equipment wherein actuation in response to the position of an object or objects, or the presence or absence thereof, is desired.

The invention will be more fully understood by reference to the following detailed description thereof, taken in conjunction with the drawings, in which:

FIG. 1 shows a general arrangement of the apparatus of the invention;

FIGS. 2–5 illustration bandwith consideration for traveling wave operation;

Figure 1:
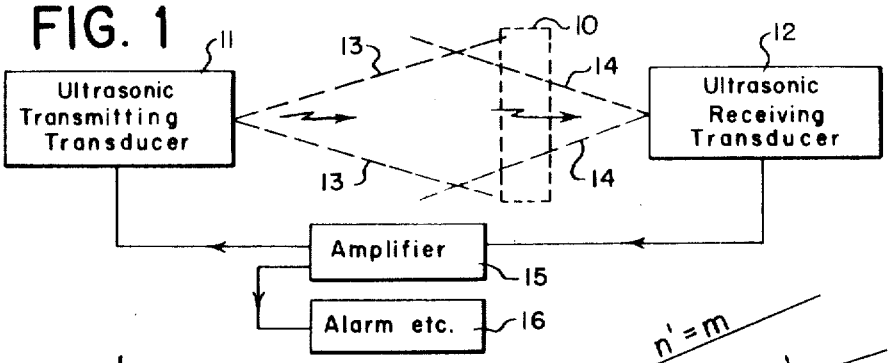

Referring to FIG. 1, ultrasonic transmitting and receiving transducers 11, 12 have respective beam widths shown by dotted lines 13, 14. Because of the high frequencies involved, beams 13 and 14 may be made quite narrow, thus promoting efficient transmission and reception of ultrasonic energy, and also reasonably sharp delineation of the detection path.

As shown, the two beam patterns (sensitivity patterns) are coaxial. However, the transducers can be arranged so that their beam patterns are at an angle to each other or, for some applications, the transmitting beam may be directed at a surface which reflects it toward the receiving transducer. The beam widths and relative orientation may be selected as meets the requirements of a given application.

Amplifier 15 has its input connected to receiving transducer 12 and its output connected to transmitting transducer 11. The two transducers, the amplifier and the air in which the ultrasonic waves are propagated comprise a closed regenerative feedback loop. Hence, with sufficient gain in amplifier 15, sustained oscillations may be set up in the loop in the absence of an interfering object. If, then, an object such as shown by the dotted block 10 is interposed in the acoustic path between the transducers, the amount of ultrasonic energy reaching the receiving transducer 12 will be reduced to the point where oscillations cease.

The presence or absence of oscillations in the closed loop may be detected in any desired manner and used to actuate an alarm, a control mechanism, etc., generally designated as 16.

When in the condition of stable oscillation, the power gain around the loop will be unity, since if the loop gain exceeds unity the oscillations will build up to a larger amplitude whereas if it is less than unity the oscillations will die out. It is advantageous to design amplifier 15 so that it saturates at a predetermined level where the output is sufficient to maintain stable oscillations for a given low value of input signal. Then, when the input signal exceeds the given low value, the extent to which the amplifier is driven into its saturation region represents a reserve available to maintain oscillations for lower values of input signal. That is, if an input signal is considerably greater than the given value required to produce saturation, it may decrease to the given value while still maintaining continuous-wave oscillations.

Normally ultrasonic transducers have very sharp resonance curves and the gain at reasonance is much greater than the gain at frequencies considerably off-resonance. As will be described shortly, the bandwidth over which the loop gain is at least unity is important in securing reliable operation under varying conditions. Accordingly, the amplifier is advantageously designed so that at the off-reasonance frequencies giving the required bandwidth, the gain is sufficient so that the corresponding low level input signals drive the amplifier to the predetermined saturation level. Then, at or near resonance the amplifier is driven far into its saturation region so that the power output to the transmitting transducer remains fairly constant.

This and other factors entering into the amplifier design will be described in connection with FIGS. 14–16, after the bandwidth and phase shift requirements have been explained.

Turning now to these requirements, two types of operation may be obtained with the apparatus of FIG. 1, depending on the spacing of the tranducers and other factors discussed hereinafter. They may be generally described as traveling wave operation and standing wave operation. Depending upon the conditions of the particular application, one type of operation may be present to the substantial exclusion of the other, or both types of operation may be present simultaneously. The traveling wave operation will be described first.

Ultrasonic waves are acoustic waves and have a fairly short wavelength in a gaseous medium. For example, a 40-kilocycle ultrasonic wave propagating in air at 72° F. has a velocity of propagation of about 1130 feet per second and a corresponding wavelength of about ⅓ of an inch. Consequently, in most applications the spacing between transducers will be a considerable number of wavelengths. If the spacing is sufficiently large, very little acoustic energy reflected from the receiving transducer will return to the transmitting transducer. Consequently, substantially only traveling waves will exist.

The number of wavelenghs between the transducers will depend upon the separation thereof and the velocity of propagation in the medium. As the separation increases, more wavelengths will be present between the transducers. As the velocity of propagation increases, fewer wavelengths will be present. Thus, the ratio c/L is an important factor, where c is the velocity of propagation and L is the path length between the transducers.

In order to maintain stable oscillations in the regenerative feedback loop, the closed loop power gain must be unity. In addition, the total phase shift around the loop must be an integral number of $2\pi$ radians. The phase condition for oscillation is:

$$\alpha+(\phi+\beta+\omega)=2\pi; \qquad (1)$$

where $\alpha$=phase shift in the acoustic beam from transmitting to receiving transducers
$\phi$=phase shift in the amplifier
$\beta$=phase shift in the transmitting transducer
$\omega$=phase shift in the receiving transducer
n=0, 1, 2, etc.

Because each wavelength $\lambda$ in the acoustic beam produces a phase shift of $2\pi$, the total phase shift in the beam for a path length L is $$\alpha=2\pi L/\lambda \qquad (2)$$

In terms of the frequency f and velocity of propagation c, this becomes:

$$\alpha=2\pi fL/c \qquad (3)$$

Ultrasonic transducers commonly have very sharply resonating electro-mechanical elements and the bandwidth of such transducers (taken, for example, to the 3 db points) is commonly very narrow. On the other hand, it is a relatively simple matter to build an electronic amplifier whose bandwidth is much greater than that of the transducers. Consequently, as the operating frequency varies, amplifier phase variations will usually be small compared to transducer phase variations and may be neglected. For convenience in this discussion, the amplifier phase shift will further be assumed to be zero. Also, in the initial discussion, variations in phase of the transducers will be neglected and the respective phase shifts assumed to be zero.

Under these assumptions, the frequency of operation of the loop, if sufficient loop gain is provided by the amplifier to assure oscillation, may be determined from Equations 1 and 3 and is:

$$f=n'c/L \qquad (4)$$

where the integer n′ is the number of wavelengths in the acoustic path between transmitting and receiving transducers.

From Equation 4 it will be seen that if the velocity of propagation c should change due to a change in temperature, pressure, etc., the operating frequency will shift. Similarly, if the path length L is changed, a frequency shift will result.

Figure 2:
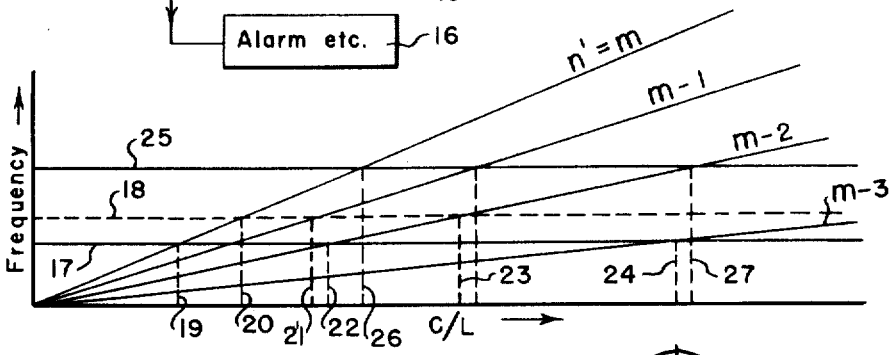

Referring now to FIG. 2, a graph is shown in which frequency is plotted against the ratio c/L. The diagonal lines are labelled m, m–1, m–2, m–3, where the integer m is the number of wavelengths between the transducers under one set of conditions and the values m–1, m–2, etc. represent successively decreasing numbers of wavelengths.

The bandwidth over which the power gain is at least equal to unity will be termed GBW. In FIG. 2, consider first the GBW represented by lines 17 and 18. For a relatively small value of c/L operation along line m can take place over the range indicated by dotted lines 19 and 20. As the c/L ratio increases beyond line 20, operation is no longer possible with a total number of wavelengths m between the transducers, since the loop power gain goes below unity at the upper limit of the GBW represented by line 18. However, it will be noted that line m–1 goes above line 17 just before dotted line 20 is reached. Consequently, the frequency of operation will drop so that oscillations are continued with one less wavelength between the transducers. This condition persists until dotted line 21 is reached. At this value of c/L oscillations must cease since neither lines m–1 nor m–2 are within the GBW. Consequently, for values of c/L lying between dotted lines 21 and 22, oscillations will not be produced. At line 22 oscillations will resume with a number of wavelengths m–2 between the transducers, and will continue until dotted line 23 is reached. They will then cease until dotted line 24 is reached, whereupon they will resume with a total number of wavelengths m–3 between the transducers.

It is clear from this explanation that the bandwidth 17, 18 over which the power gain it at least unity is too narrow to assure proper operation over the range of c/L depicted.

Now assume that the bandwidth over which the gain is at least equal to unity extends from line 17 to line 25. It will be observed that due to the wider GBW, operation along line m is possible until a value of c/L represented by dotted line 26 is reached. Indeed, at this point operation at frequencies giving the number of wavelengths m, m–1 or m–2 is possible. The actual operating frequency will depend upon the gain available at the several frequencies. Generally speaking, operation will continue at one frequency until the available gain for another frequency is slightly greater, whereupon it will jump to the new frequency.

Operation along line m–2 is possible until dotted line 27 is reached, whereupon operation is possible along line m–3. It will therefore be seen that by providing a wider GBW, operation is possible over the entire range of c/L depicted. At any region, the closed loop power gain is at least equal to unity throughout a variation of c/L producing at least one wavelength change in the number of acoustic wavelengths between the transducers.

Design criteria can be developed for the traveling wave operation which are helpful in a particular application.

Figure 3:
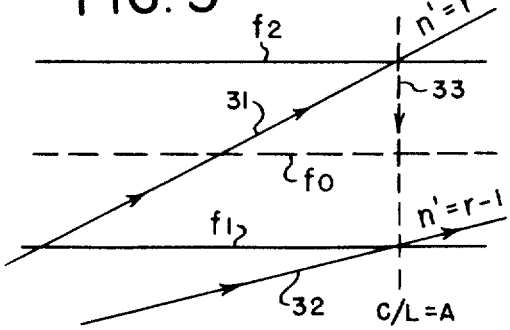

FIG. 3 shows a portion of FIG. 2 expanded and representing a limiting condition. Here the GBW extends from a lower frequency limit $f_1$ to an upper frequency limit $f_2$. A mid-frequency is designated $f_0$. Diagonal line 31 represents a condition where the number of wavelengths between the transducers is equal to r. Diagonal line 32 is a line for r–1 wavelengths between transducers. They are drawn so that line 31 passes out of the operating frequency band as line 32 enters it. Thus, the frequency of operation jumps from $f_2$ to $f_1$ along line 33. The corresponding value of c/L at line 33 will be termed A. From Equation 4 the following relationships can be written for the limiting condition of FIG. 3:

$$f_1=A(r-1) \quad (5)$$

$$f_2=Ar \quad (6)$$

$$GBW=f_2-f_1=A \quad (7)$$

The nominal center frequency $f_0$ can be taken as the average of the two limiting frequencies and is equal to:

$$f_0=A(r-\tfrac{1}{2}) \quad (8)$$

A design factor that is convenient to use is the percentage bandwidth. This is the bandwidth over which the loop gain is at least equal to unity, divided by the nominal frequency $f_0$. Since in general the number of wavelengths between the two transducers greatly exceed unity, the term ½ in Equation 8 can be neglected and the percent bandwidth becomes:

$$\text{per cent } GBW=\frac{100}{r}\text{(approx.)} \quad (9)$$

Another useful design factor is the reciprocal of the fractional bandwidth over which gain is at least unity, a quantity similar to the quantity Q used in electrical circuit theory. This quantity will be termed Q'. In this analysis its value becomes:

$$Q'=r \quad (10)$$

It will be recalled that r represents the number of wave lengths between the two transducers and is assumed to be much greater than unity. If it is not, appropriate corrections can be made in Equations 9 and 10.

The above Equations 5–10 apply to any value of c/L with traveling wave operation under the assumption that the phases in the transducers and amplifier do not vary over the frequency range of operation. Actually, a further assumption was made that the phases were zero. Fixed phases other than zero will merely slightly shift the slope of the lines m, m–1, etc. in FIG. 2, Equation 4 becoming:

$$f=\left(n'-\frac{\phi+\beta+\phi}{2}\right)c/L \quad (4a)$$

Thus Equations 5–10 continues to apply adequately.

It will be observed from Equation 7 that the larger the value of c/L, the larger the bandwidth required. Thus, in a given application, in order to insure that the apparatus will operate properly, the bandwith should be selected for the maximum value of c/L expected to be encountered.

The resonant frequency and frequency bandwidth of trandsucers are intimately related in design, and the quantity Q' is a function of this bandwith and amplifier gain. Accordingly a relationship between nominal design frequency and Q' is often helpful. From Equations 10 and 8, again neglecting the term ½ in the latter:

$$f_0 \geqslant Q'(c/L)_{max} \quad (11)$$

As the sign indicates, this represents the limiting value of $f_0$, and $f_0$ may be higher than the limiting value if desired.

In the design of apparatus for a given application the maximum value of c/L may first be determined and then a tabulation made of corresponding values of $f_0$ and Q'. A nominal operating frequency and a corresponding value of Q' are then selected which are capable of being physically realized and yield the best economic balance between transducer and amplifier cost.

As pointed out, Equations 5–11 assume that the phase in the transducers does not vary over the operating frequency band. In practice, since the transducers are sharply resonant, there is likely to be a substantial phase shift between upper and lower operating frequencies. For design calculations it is usually reasonable to assume that the phase characteristics of the transducers are symmetrical about the center frequency and that the phase shifts of the two transducers are the same. The phase shift in the amplifier between upper and lower frequency limits can still be neglected for most applications.

Accordingly it may be assumed that at the lowest operating frequency f, the transducers have a combined phase lead of $2\beta$, and that at the highest operating frequency $f_2$ they have a combined phase lag of $2\beta$. Equations 5 and 6 then become:

$$f_1=A(r-1-\beta/\pi) \quad (12)$$

$$f_2=A(r+\beta/\pi) \quad (13)$$

For the usual types of ultrasonic transducers the phase shift $\beta$ in each transducer will not exceed $\pm\pi/2$. With this value introduced into Equations 12 and 13, Equations 7, 9, 10, 11 then become:

$$GBW=2A \quad (14)$$

$$\text{percent } GBW=\frac{200}{r}(\text{approx.}) \quad (15)$$

$$Q'=r/2 \quad (16)$$

$$f_0 \geqslant 2Q'(c/L)_{max} \quad (17)$$

It is thus seen that if the frequency band is sufficiently wide so that there is substantial phase shift in the transducers, the required GBW lies between c/L and 2c/L at any point in the operating region. In a particular application c/L should be the maximum expected to be encountered, in determining GBW. If the two transducers are not the same, or if their maximum phase shift differs from $$\frac{\pi}{2}$$

or if the amplifier phase shift varies substantially over the frequency band, appropriate modifications may be made in the foregoing equations.

Figure 4:
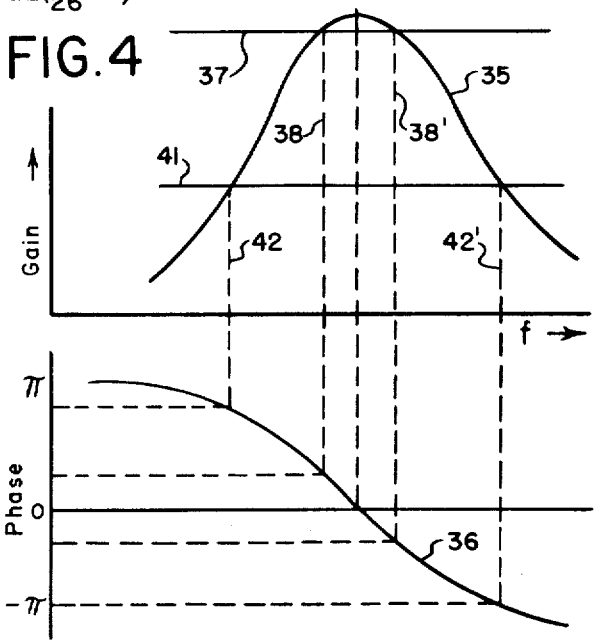

FIG. 4 further illustrates the traveling wave type of operation. Here the resonance curve 35 represents the variation in gain with frequency for all elements of the closed loop except the acoustic path. Curve 36 is a corresponding plot of relative phase versus frequency. As specifically shown, the amplifier is assumed to have zero phase shift throughout the frequency band shown, so that curve 36 varies from $+\pi$ to $-\pi$ to represent the combined phase shift of both transducers. Similar curves can be drawn to take into account amplifier phase shifts and change of gain with frequency, if present.

If, by employing Equations 9, 10 and 11 in the design a frequency band lying between the limits shown by lines 38, 38' is calculated, it is evident that the results are approximately correct since the corresponding phase shift is small. The amplifier may then be designed to give a threshold of unity closed loop gain at frequencies 38, 38', as illustrated by line 37. Preferably a somewhat lower threshold is desirable to take into account the small phase shift present, and to provide a safety factor.

On the other hand, if calculations based on Equations 5–11 give a frequency band over which there is considerable phase shift, then recalculations may be made using Equations 12–17. In FIG. 4 there is considerable phase shift over the frequency band between the limits shown by lines 42, 42' and Equations 12–17 apply more closely. For operation over such a range, the amplifier should be designed with a threshold of unity closed loop gain at frequencies 42, 42', as illustrated by line 41, or somewhat lower as a safety factor.

While the foregoing equations are considered helpful, other design procedures may be employed if desired.

In actual use, an apparatus designed to operate up to a predetermined maximum value of c/L may be called upon to operate from a relatively small value of c/L up to the maximum value, or from the maximum value to a smaller value. Such changes may be the result of changes in the separation of the transducers, or changes in the velocity of propagation, or both. In the regions of smaller values the changes in operating frequency may be quite small, whereas in regions of larger values they may be quite large. This situation is shown in FIG. 5 for both increasing and decreasing changes in c/L.

Figure 5:
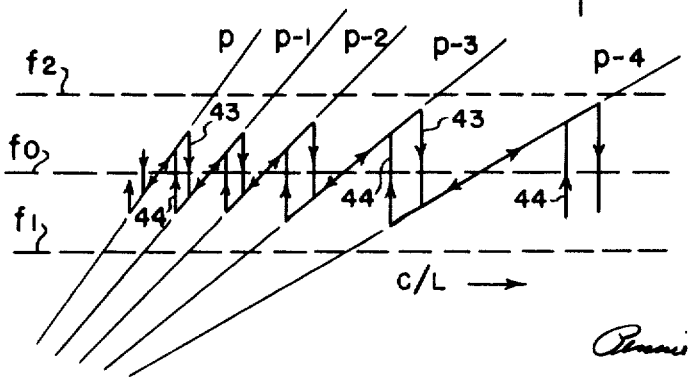

Referring to FIG. 5, lines $f_1$ and $f_2$ represent lower and upper frequency limits for gain at least equal to unity, and line $f_0$ is the nominal design center frequency. Lines p to p–4 represent successive decreases in the number of wavelengths between the transducers. Zigzag lines 43 and 44 show the manner in which the operating frequency changes when moving in opposite directions.

Considering zigzag line 43, as indicated by the arrows, for smaller values of c/L the operating frequency proceeds along line p until the gain for the p–1 mode slightly exceeds that for p, whereupon the operating frequency shifts downward to the p–1 mode and proceeds along that line until it suddenly jumps to the p–2 mode, etc. As the c/L ratio increases, wider and wider frequency excursions are required before the jumps occur.

On the other hand, starting at the right of the diagram with line 44, operation proceeds downward in the p–4 mode to a somewhat lower value before jumping to the p-3 mode. This is because operation in one mode tends to persist until the gain in another mode is greater by a small but significant amount. Consequently, there is a slight difference in the paths which is analogous to a hysteresis effect. Because of this effect, in general a slightly wider frequency band is desirable for operation with both increasing and decreasing values of c/L than is strictly necessary for operation in only one direction.

The traveling wave operation explained above in general takes place with relatively large separation of transducers or where the faces of the transducers are oriented so as to discourage setting up standing waves. However, standing wave operation is possible with transducers whose acoustic impedance is sufficiently different from that of the air or other gaseous medium with which it is used, so as to offer a substantial impedance mismatch and consequent reflection of acoustic energy incident thereon. With such transducers, standing wave operation is promoted by relatively close spacing of the transducers and by arranging the transducer faces in parallel planes.

Figure 6:
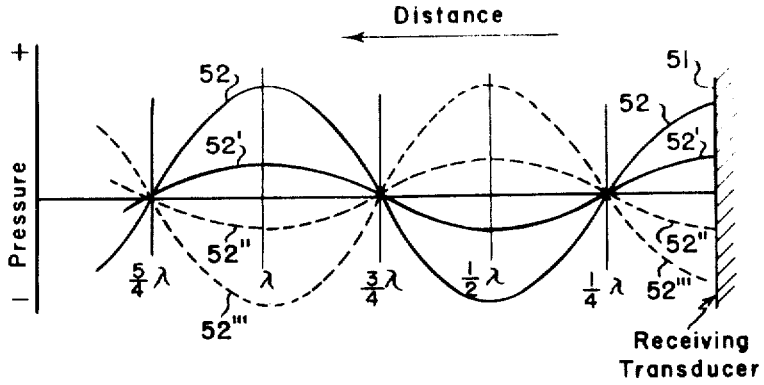
FIGS. 6–11 are explanatory of standing wave operations.

Referring to FIG. 6, the surface of the receiving transducer is represented at 51. The faces of both receiving and transmitting transducers are assumed to be highly reflecting for incident acoustic energy. This will be true when the acoustic impedance of the transducers is large compared to air. Due to the large acoustic impedance, a pressure maximum will be present at the face of the receiving transducer 51. Curves 52, 52', 52'', 52''' show pressure amplitudes and phase as a function of distance from the surface of the receiving transducer for several different instants of time during one period of oscillation. Curve 52 shows the maximum positive pressure at the receiving transducer. At a distance $\frac{1}{4}\lambda$ the pressure is zero and at $\frac{1}{2}\lambda$ it is a maximum in the negative direction. The pressure becomes zero again at $\frac{3}{4}\lambda$ and a maximum in the positive direction at $\lambda$. Curve 52' corresponds to a slightl later instant during one oscillation period and has the same phase as curve 52 but is smaller in amplitude. The horizontal axis may be taken to represent a still later instant when pressure is zero at all distances from the receiving transducer. Dotted lines 52'' and 52''' represent successively later instants when the pressure at the receiving transducer is negative and phases are reversed at any given distance from the transducer.

It will be noted that at distances of $\frac{1}{4}\lambda$, $\frac{3}{4}\lambda$, etc. the pressure is always zero. Also, at any given instant in time the phase of the pressure standing waves reverses by 180° each half-wavelength.

Figure 7:
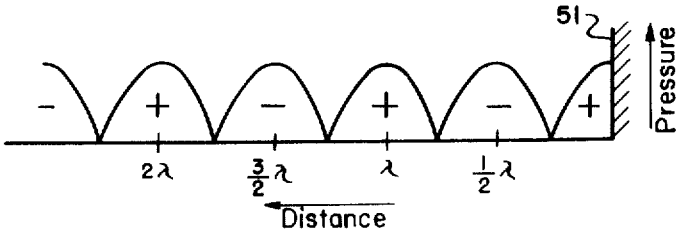

FIG. 7 shows another conventional manner of plotting pressure standing waves, with maximum pressure plotted as a function of distance. The plus and minus signs indicate the phase at any position, assuming that the pressure is positive at the transducer surface 51. A half-cycle later a maximum negative pressure will occur at the transducer surface 51 and all signs will reverse.

Figure 8:
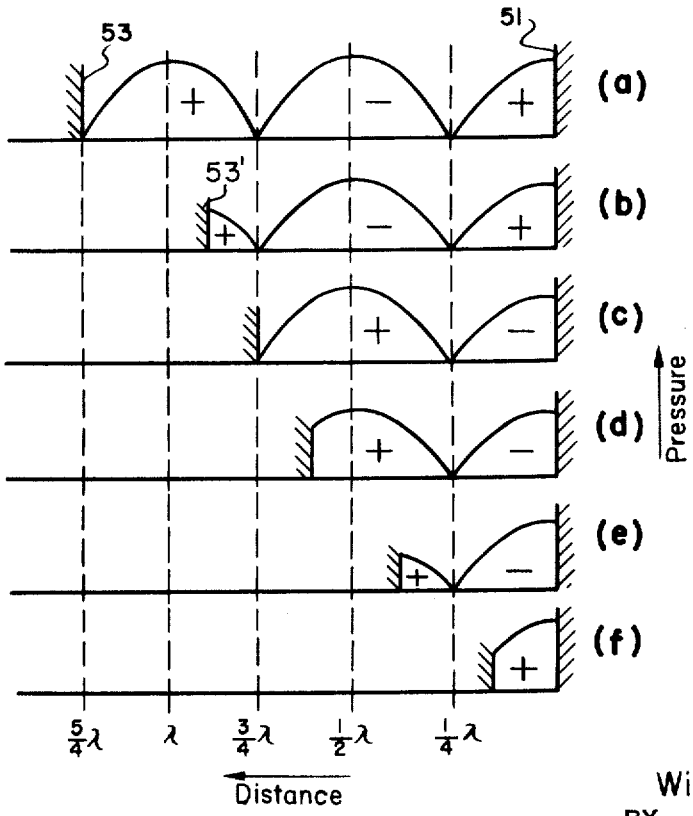

FIG. 8 shows the relative phase between transmitting and receiving transducer for different separations thereof. Although there will commonly be a considerable number of wavelengths between the two transducers, FIG. 8 shows separations decreasing from $\frac{5}{4}\lambda$ to less than $\frac{1}{4}\lambda$ for convenience of illustration, since the patterns repeat at each full wavelength. Thus the special situations plotted in FIG. 8 are actually completely general.

The transmitting transducer surface is denoted 53 in FIG. 8a. In FIG. 8b the transmitting transducer surface is closer to the receiver transducer surface 51, as shown at 53', and similarly for subsequent portions of FIG. 8.

It is assumed that at the instants depicted the pressure at the transmitting transducer is zero or positive, as the case may be. From FIGS. 8a and b, it is clear that the received pressure is in phase with the transmitted pressure for wavelengths between $\frac{5}{4}\lambda$ and $\frac{3}{4}\lambda$. From FIGS. 8c, d and e, it is seen that the transmitter and receiver pressures are 180° out of phase between $\frac{3}{4}\lambda$ and $\frac{1}{4}\lambda$. This behavior repeats each wavelength. Thus, it becomes clear than the relative phase shifts by 180° increments at all odd $\frac{1}{4}\lambda$ positions. It will be understood that a half cycle later in time, all signs in FIG. 8 will reverse, but the relative phases between transmitter and receiver transducers will remain the same.

If the separation between transmitter and receiver transducers is between $\frac{5}{4}\lambda$ and $\frac{3}{4}\lambda$ (plus any integral number of wavelengths), operation in a standing wave mode can be obtained if the transmitting and receiving transducers are in phase and the loop power gain is at least unity. On the other hand, if the separation is between $\frac{3}{4}\lambda$ and $\frac{1}{4}\lambda$ (plus any integral number of wavelengths), oscillations will be produced if the transmitter and receiving transducers are 180° out of phase, and the power gain is at least unity.

Reliable operation under standing wave conditions can be achieved by making use of the resonant characteristics of the transmitting and receiving transducers, particularly the phase shifts which accompany departures from resonance. As mentioned above, ultrasonic transducers commonly have sharp resonance characteristics, due primarily to the vibrating mechanical or electromechanical elements thereof. Thus the response amplitude changes rapidly above and below the resonant frequency. The amplitude changes are accompanied by phase shifts considerably exceeding 90° from below resonance to above resonance conditions, and approaching 180° in many cases.

At the transmitting tranducer such phase shifts occur between the exciting A.-C. wave and the response of the diaphragm which produces acoustic waves in the air. At the receiving transducer such phase shifts occur between the received acoustic wave and the resulting output A.-C. wave. It is therefore seen that combined phase shifts of 180° (or more if required) can be obtained by the action of the two transducers as the operating frequency changes from below resonance to above resonance.

Thus, when the wavelength separation changes so that the standing wave pattern introduces a 180° change in the relative phase of the acoustic wave at transmitting and receiving transducers, a change in operating frequency will produce corresponding phase shifts in the two transducers so that the combined phase shifts around the closed loop total zero or an integral multiple of $2\pi$ radians (360°).

It has been found that by selecting the amplifier gain so that the loop gain is at least unity throughout a frequency range that produces phase shifts in the transducers to compensate for approximately a 180° phase shift in the acoustic wave between the transducers, the operating frequency will automatically change to maintain oscillations as the wavelength separation of the transducers changes.

Figure 9:
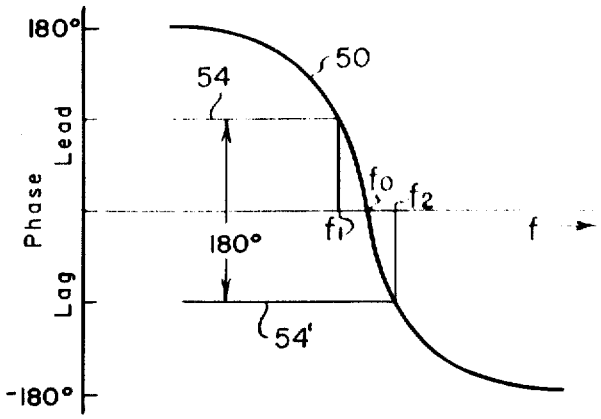

This operation is illustrated in FIG. 9 wherein curve 50 represents the phase versus frequency characteristic of the two transducers combined. The terms "lead" and "lag" are relative, and are here shown with respect to the phase at the resonant frequency $f_0$. It is assumed that each transducer has a 90° phase shift at frequencies well above and below its resonant frequency, with respect to its corresponding phase at resonance. This gives a total available phase shift extending from +180° to −180°. Intermediate lines 54, 54' represent a phase difference of 180°, the lines being ±90°, respectively. Thus, in going from frequency $f_1$ to $f_2$, or vice versa, a 180° phase shift is obtained. If the amplifier gain is sufficiently high to maintain at least unity gain over the frequency range from $f_1$ to $f_2$, stable oscillations can be obtained as the wavelength separation of the transducers varies.

Although FIG. 9 is broadly applicable to various types of transducers, it will be applied in somewhat more detail to magnetostrictive transducers, an example of which is described hereinafter in connection with FIG. 13. As a transmitting transducer, taking the current in the exciting coil as a reference, above resonance the velocity of the diaphragm lags the phase of the velocity at resonance, and below resonance it leads. As a receiving transducer, taking the pressure in the received acoustic wave as a reference, above resonance the voltage induced in the coil lags the phase of the voltage at resonance, and below resonance it leads. At the transmitter transducer, the phase of the acoustic pressure wave is related to the diaphragm velocity through the acoustic impedance of the air, as will be understood by those skilled in the art. Also, since the output of the receiver transducer is supplied through the amplifier to drive the transmitter transducer, the phase of the transmitter coil current is related to the receiver induced voltage through the intervening electrical circuit. Accordingly, when the standing wave condition so requires, the operating frequency changes to produce phase shifts in the two transducers which maintain the phase condition for oscillation.

Phase shifts may also exist in the electrical portion of the loop. For example, in the circuit shown in FIG. 14, wherein the inductance of the receiver transducer coil 91 is tuned by capacitor 95 to the frequency of mechanical resonance, a phase shift will be produced between the induced voltage in coil 91 and the output voltage across capacitor 95. Similarly, with the exciting coil 91' of the transmitting transducer tuned to the frequency of mechanical resonance by capacitor 95', there will be a phase shift between the voltage across capacitor 95' and the current through coil 91. Amplifier 94 may also have tuned circuits which introduce phase shifts.

The resonance curves of these electrical circuits will commonly be much broader than those of the mechanical resonance of the transducers, and therefore will introduce merely a substantially fixed phase in the loop circuit. If, however, there are phase shifts in the electrical circuits which vary with frequency, they may be combined with the transducer phase shifts and the emplifier gain selected to maintain at least unity loop gain over a frequency range corresponding to a combined phase shift of 180° at the transducers.

From the overall point of view, as the c/L ratio varies to introduce a 180° phase shift between the pressures of the acoustic waves at transmitting and receiving transducers, the operating frequency changes over a range such that the resulting phase shifts in the transducers and electrical portions of the loop maintain the total phase shift around the closed loop equal to zero or an integral multiple of $2\pi$ radians (360°) and the amplifier gain is selected to maintain a closed loop power gain of at least unity over this frequency range. In this manner, continuous oscillations may be maintained with a standing wave mode of propagation.

In a particular application, the phase shifts in the particular transducers selected, and in the electrical portion of the loop, may be determined by analysis or empirically, as will be understood by those skilled in the art.

In FIG. 9 the operation is shown as symmetrical above and below the resonant frequency $f_0$. Such operation may be obtained by proper choice of phase shifts around the loop, with the addition of phase-shifting networks in the amplifier or elsewhere if required. However, it will be noted that the available phase shift is considerably greater than 180° so that symmetrical operation is not essential, although it is preferred so as to reduce the maximum gain required in the amplifier.

Figure 10:
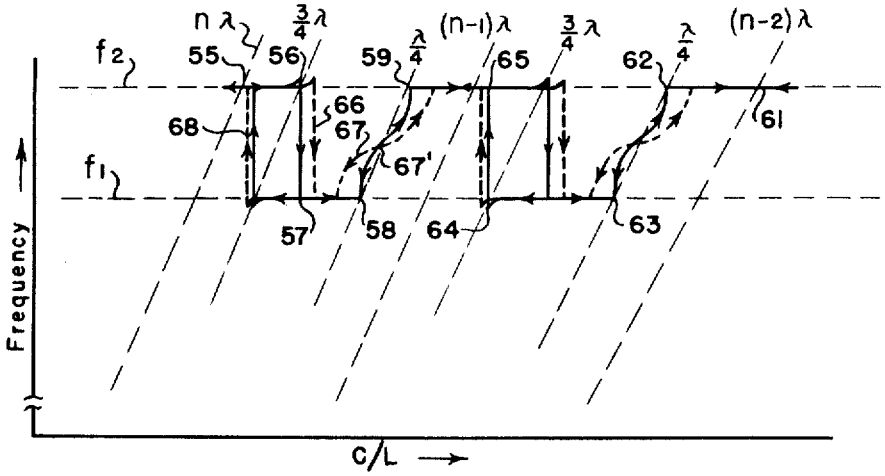

FIG. 10 is an illustration of the type of operation under standing wave conditions. The manner of presentation is analogous to that employed in connection with the traveling wave situation. For convenience of explanation, it is assumed that the transducers and electrical circuit are designed so that the shift in operating frequency from $f_2$ to $f_1$, and vice versa, takes place at odd quarter wavelengths, corresponding to the change in relative phase of transmitted and received pressure waves shown in FIG. 8. The slanting dash lines are designated $n\lambda$, $(n-1)\lambda$ and $(n-2)\lambda$ to indicate successive changes in path length by one wavelength, as the c/L ratio varies. Intermediate lines $\frac{3}{4}\lambda$ and $\frac{1}{4}\lambda$ are also shown. Typical manners in which the operating frequency changes are shown in full and dotted lines. For other designs of transducers, amplifiers, etc., the frequency shifts may take place at different points within a wavelength, and the patterns shown in full and dotted lines may shift somewhat to the right or left relative to the loci of the slanting dash lines.

As illustrated, starting at point 55 and going in the direction of increasing values of c/L, it is assumed that the phases in the electrical portion of the loop are such that operation is first at the upper frequency limit $f_2$, with the pressures at the two transducers in phase. The frequency remains constant at this upper value as the path length decreases (or velocity of propagation increases) until the $\frac{3}{4}\lambda$ point is reached. At the $\frac{3}{4}\lambda$ point, the phase must shift by 180° to maintain oscillation, as shown in FIG. 8. Momentarily, the apparatus may attempt to shift to a frequency somewhat higher than $f_2$ so as to increase the phase lag, thus producing a small rising cusp 56. However, as is apparent from FIG. 4, the resonant curve of the transducers is falling sharply in this region, so a point will quickly be reached at which the loop gain falls below unity. Thus, the frequency cannot continue to shift in this direction sufficiently to produce the required 180° phase shift with loop gain at least equal to unity.

Consequently, the frequency of operation will jump to the lower frequency $f_1$ (point 57) at which the phase leads that of $f_2$ by 180°. This, together with the acoustic phase shift in going past the $\frac{3}{4}\lambda$ point, gives a resulting phase shift of 360°, restoring the regenerative condition. The frequency will stay substantially constant at $f_1$ until the $\frac{1}{4}\lambda$ point is reached at 53. Here the relative phase in air changes rapidly by 180°, as shown in FIG. 8, and the frequency of operation changes from $f_1$ to $f_2$ to introduce a corresponding 180° phase shift and restore the regenerative condition.

As is seen from FIG. 9, there is curvature in curve 50 between $f_1$ and $f_2$. Consequently, in FIG. 10 some curvature between points 58 and 59 may be expected, as shown. If the phase characteristic were more linear, the curve between 58 and 59 would be straighter. From point 59 through the line $(n-1)\lambda$ to the next $\frac{3}{4}\lambda$ point the relative phase in air remains constant and consequently operation remain at frequency $f_2$. Thereupon, the cycle repeats.

For decreasing values of c/L, the reverse of the above operation takes place with slight differences akin to a hysteresis effect. Thus, starting at point 61 and traveling toward point 62, the frequency remains constant at $f_2$ and then decreases to $f_1$ at point 63, when the $\frac{1}{4}\lambda$ line is reached. Thereafter, the frequency remains constant $f_1$ until the $\frac{3}{4}\lambda$ is reached at point 64. A slight falling cusp may be expected before the frequency jumps suddenly to $f_2$ at point 65. The cycle then repeats.

The explanation of the standing wave mode of operation given so far assumes that a pressure maximum is always present at the surface of the receiving transducer. This is true at the design center frequency $f_0$ where the transducer acoustic impedance is essentially purely resistive and much greater than that of the surrounding air. However, due to mechanical resonance, at frequencies away from $f_0$ will have a reactance component. Thus, at frequencies below $f_0$ the transducer has a stiffness reactance whereas at frequencies above $f_0$ it has an inertial reactance. In each case, however, the magnitude of the impedance is much greater than that of the surrounding air.

Figure 11:
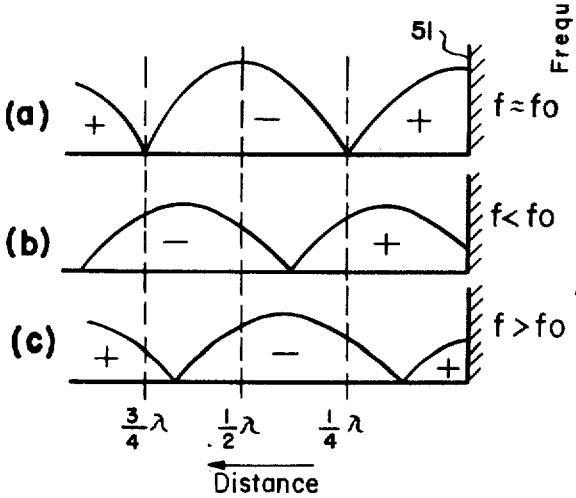

FIG. 11 illustrates the effect of the receiving transducer reactance on the pressure standing waves. FIG. 11a represents the condition at $f_0$ where the transducer impedance is substantially a high resistance. This is the situation shown, for example, in FIG. 8a.

At frequencies below $f_0$, where the transducer has a stiffness reactance, the standing wave pattern shifts to the left, as illustrated in FIG. 11b. On the other hand, at frequencies above $f_0$, where the transducer has an inertial reactance, the standing wave pattern shifts to the right, as illustrated in FIG. 11c. The shifts in the pattern are exaggerated in FIG. 11, and will ordinarily be fairly small. Also, the change in wavelength with frequency is disregarded, for simplicity. The latter is taken into account in FIG. 10 by the slanting of the wavelength lines.

The shift in the standing wave patterns due to the reactance of the transducers above and below resonance produces some modification in the paths shown in full lines in FIG. 10. As seen from FIGS. 11a and c, when the operating frequency is above $f_0$, instead of a phase shift of 180° being required at the $\frac{3}{4}\lambda$ point, it will be required somewhat to the right of that point. Consequently, in FIG. 10 the jump from $f_2$ to $f_1$ takes place slightly to the right of the $\frac{3}{4}\lambda$ line, as shown by dotted line 66.

On the other hand, as seen from FIGS. 11a and 11b, when the operating frequency is below $f_0$, instead of a shift in phase taking place at the $\frac{1}{4}\lambda$ point, it takes place somewhat to the left thereof. Consequently, the shift from $f_1$ to $f_2$ in FIG. 10 starts somewhat to the left of point 58, as shown by the dotted line 67. Midway between $f_1$ and $f_2$ line 67 crosses the full line, as shown at point 67' corresponding to frequency $f_0$. Line 67 reaches $f_2$ somewhat to the right of point 59 due to the shift in standing wave pattern illustrated in FIG. 11c.

For travel rom right to left of FIG. 10, corresponding changes occur, as shown by the dotted line 67 taken in its reverse direction, and by dotted line 68.

From the above discussion of operation in the standing wave mode, it will be clear that under conditions resulting in this mode of operation the bandwidth requirements are less stringent than would result if traveling wave operation alone were present. For small spacings between transmitting and receiving transducers, if traveling wave operation alone existed, a comparatively wide bandwidth over which gain was at least unity would be required to take care of changing values of c or L. However, with standing wave operation for these same relatively small spacings, the bandwidth over which gain is at least unity need only be approximately equal to a frequency difference producing a 180° phase shift in the resonant transducers. Thus, it is preferred to employ the traveling wave mode of operation for long path lengths and standing wave operation for short path lengths.

Generally speaking, standing wave operation is obtained where the standing wave ratio approaches large values. This standing wave ratio, as is well known, is the ratio of maximum pressure to minimum pressure as the pressure amplitude is measured as a function of distance between the transducers. On the other hand, when the standing wave ratio approaches unity, traveling wave operation is obtained.

Standing wave operation is promoted by short path lengths, by arranging the transmitting and receiving transducers so that their beams are substantially coaxial and their faces parallel, and by employing transducers with acoustic impedances high compared to air. On the other hand, traveling wave operation is promoted by greater separation, non-coaxial beams and non-parallel faces, and transducers of lower acoustic impedance.

If a given system is operated over a sufficiently wide range of values of c/L, there will be a transition region between predominantly standing wave operation and predominantly traveling wave operation where both are present to varying degrees.

Figure 12:
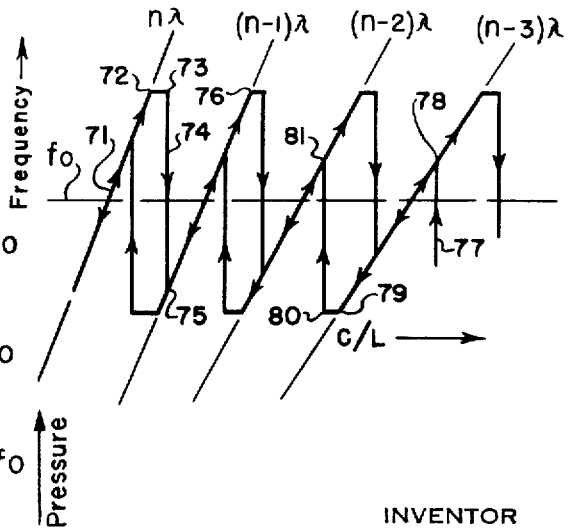
FIG. 12 is explanatory of combined traveling wave and standing wave operation.

FIG. 12 illustrates the manner in which the apparatus functions in this intermediate transition region. Here, frequency is plotted against c/L as before, and the slanting lines $n\lambda$ to $(n-3)\lambda$ designate integral changes in the number of wavelengths between the transducers. The nominal design center frequency $f_0$ is also shown.

Starting at point 71 and proceeding toward the right of the diagram, the frequency of operation increases along the line $n\lambda$ until point 72 is reached. This is similar to the operation explained in connection with FIG. 5. However, with both standing waves and traveling waves present, the operation will be determined by whichever mode of propagation leads to the highest loop gain. At point 72 it is assumed that the gain for the traveling wave motion has decreased until the gain in the standing wave mode begins to predominate. At this point the operating frequency will remain constant since the standing wave experiences no phase shift until the path length decreases by $\frac{1}{4}\lambda$, as discussed in connection with FIGS. 9–11. At point 73 the standing wave mode requires a 180° phase shift to maintain oscillation and consequently the frequency drops.

It is here assumed that as the operating frequency drops along line 74 the gain in the traveling wave mode becomes greater than the gain in the standing wave mode before a 180° phase shift occurs. Consequently, the frequency will drop to the point 75 and operation will continue in the traveling wave mode along the $(n-1)\lambda$ line until point 76 is reached, whereupon operation in the standing wave mode will take over as before. This cycle will be repeated as operation proceeds toward the right of FIG. 12. Eventually, of course, operation in the standing wave mode will take over completely.

Starting now at point 77 and proceeding toward the left, it is assumed that at point 78 the traveling wave mode of operation has the greater gain so that the frequency will drop along the $(n-3)\lambda$ line until point 79 is reached. Here the gain in the standing wave mode is somewhat greater and operation proceeds at a constant frequency until point 80 is reached, whereupon the frequency will jump to point 81 where traveling wave operation will resume.

It will be understood that the operation depicted in FIG. 12 is for illustrative purposes only and that departures therefrom will occur depending upon the relative proportions of standing waves and traveling waves at various points within the transition region. However, it suffices to show that operation in the presence of both modes of propagation will take place, thus providing a smooth transition from predominantly standing wave to predominantly traveling wave operation. The net result in the transition region is that in general the bandwidth over which gain must be at least unity is less than that which would be required if no standing waves were present when going in one direction only. However, the total frequency excursion defined by the upper and lower limits reached when traveling in both directions may be approximately equal to that experienced when no standing waves are present, but will not exceed that value. This is a valuable relationship since the GBW need only be wide enough to insure continuous operation through the transition region until standing wave operation takes over. On the other side of the transition region, where traveling wave operation takes over, the GBW provided for the transition region will insure proper operation in the predominantly traveling wave region.

Many different types of transducers may be employed in the apparatus of the invention as meets the requirements of a particular application. However, the magnetostrictive transducer shown in FIG. 13 has been found satisfactory in practice and has the advantages of being comparatively simple and economical to manufacture.

Figure 13:
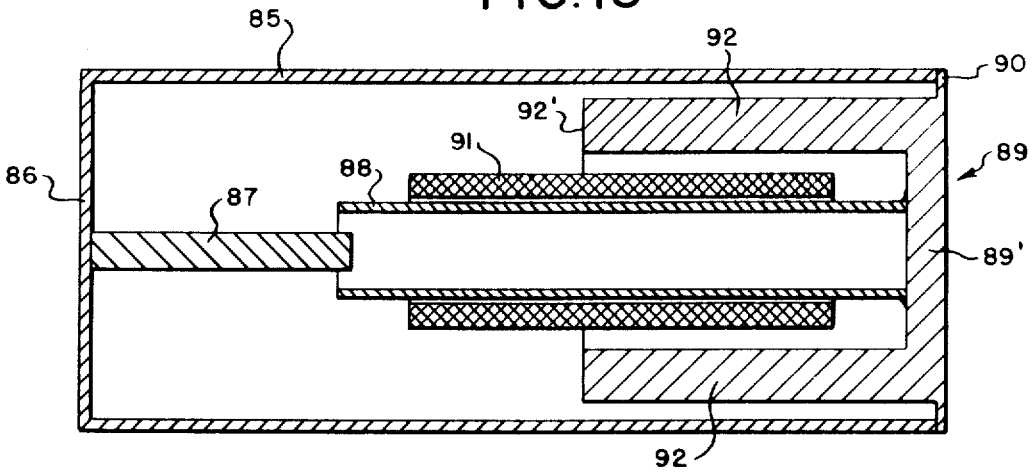
FIG. 13 is a cross-section of a suitable transducer.

Referring to FIG. 13, cylindrical casing 85, of metal, plastic or other suitable material, has an end piece 86 supporting a permanent magnet 87. A cylindrical tube 8 of magnetostrictive material is attached at its front end to the face 89' of member 89 and is surrounded by coil 91. Member 89 has a thin projecting flange 90 which is soldered or otherwise secured to the end of the cylindrical casing 85. The periphery of the circular face 89' is clamped by a tubular member 92 in a manner to be described. Member 92 may be integral with face 89' as shown. The face 89' functions essentially as a clamped circular diaphragm.

As a transmitting transducer alternating current supplied to coil 91 causes vibration of the magnetostrictive cylinder 88 in the axial direction, in the presence of the D.–C. biasing magnetic field produced by magnet 87. This causes face 89' to vibrate as a diaphragm and deliver ultrasonic power to the air or other gaseous medium with which it is in contact. On the other hand, as a receiving transducer ultrasonic energy impinging on face 89' causes axial vibration of the magnetostrictive tube 88, thereby inducing a voltage in coil 91.

The dimensions of the magnetostrictive tube 88, the diaphragm face 89' and the clamping member 92 to give the proper natural resonant frequencies are important in securing optimum operation. These resonant frequencies are functions of the actual physical dimensions and the velocities of propagation in the members.

The face 89' functions as a clamped circular diaphragm and, by itself, has a certain natural resonant frequency. The magnetostrictive tube 88, by itself, also has a natural resonant frequency. However, since the front end of tube 88 is attached to the face 89', there is coupling between the two elements which gives a resultant resonant frequency which differs from the individual resonant frequencies.

It has been found desirable to select the length of the tube 88 such that its individual half-wave resonant frequency (with both ends free) is somewhat above the individual resonant frequency of the diaphragm face 89'. Then, with the two elements attached as shown, one end of the tube 88 is free to move in air, but the end attached to the diaphragm sees a diaphragm impedance which, although high, is not infinite. The resultant resonant frequency of diaphragm and tube then lies between the two individual resonant frequencies.

For example, in a particular embodiment the resonant frequency of the diaphragm face 89', by itself, was approximately 36 kilocycles and the halfwave resonant frequency of the tube 88, by itself, was approximately 48 kilocycles. With the tube attached to the face as shown, a resultant operating freqeuncy of approximately 38.5 kilocycles was obtained. By measuring the ultrasonic power delivered to the air and trimming the length of the tube 88 if required, an optimum relationship can be obtained.

In order for the face 89' to function as a clamped circular diaphragm, its periphery must be prevented from vibrating in the axial direction. If reliance were placed upon the attachment of the periphery to the outer casing 85 to secure the clamping action, a relatively massive casing would be required. Furthermore, the operation of the transducer might be affected by the manner of mounting the casing in a wall, stand, etc., as required for a particular application.

To avoid these difficulties, cylindrical member 92 is formed integral with face 89', or rigidly attached thereto and dimensioned to form a choke or clamping member which prevents movement of the periphery of the face 89'. To this end the cylindrical member 92 is made approximately a quarter wavelength long at the operating frequency. Since the rear end 92' of member 92 is free to vibrate in air, it is freely terminated at this end and, a quarter wavelength away, the axial velocity is substantially zero. Hence, the periphery of face 89' is clamped against vibration in the axial direction.

While the quarter wavelength relationship for member 92 has been found to give good results, the length thereof is fairly critical if optimum performance is to be obtained. It has been found possible, by properly selecting the diameter of the cylindrical member 92, to cause it to function with a radial mode of oscillation also, at the operating frequency. When this is done, it is found that the length of the member is much less critical, and the diameter and thickness of the cylinder also do not require excessively close tolerances.

The radial mode of oscillation is utilized by selecting the diameter and thickness of cylinder 92 so that it is substantially one wavelength long around its periphery. When the face 89' is vibrating, the center thereof moves in and out with respect to the neutral plane. This flaxing of the diaphragm exerts forces at the periphery thereof which are in the radial direction. As will be apparent, inward and outward radial forces will be produced as the center of the diaphragm moves from the neutral plane inward and back to the neutral plane, and outward and back to the neutral plane. Accordingly the frequency of the radial forces will be twice the operating frequency of the diaphragm. Since the periphery of face 89' is integral with, or attached to, the front end of cylinder 92, these radial vibrations are communicated to the cylinder 92. With a circumferential length in cylinder 92 equal to a wavelength at the frequency of the radial vibrations, the period of propagation of a compressional wave around the cylinder is equal to the period of the radial oscillation. This is the fundamental radial mode of oscillation of a ring. Since the frequency of the radial forces is twice that of the diaphragm oscillation, the frequency of the ring mode oscillations will be twice the transducer operating frequency. It is found that with this radial oscillation present, proper clamping of the periphery of face 89' is obtained without requiring the length of cylinder 92 to be held to a very close tolerance.

The transducer shown in FIG. 13 is described more fully in copending application Serial No. 863,007, filed December 30, 1959, and the novel features thereof claimed.

In the overall operation of the apparatus depicted in FIG. 1, when an object 10 is interposed in the acoustic path, it is desirable for oscillations to cease quickly. On the other hand, when the object is removed, it is desirable for oscillations to resume immediately. Also, it is necessary that the amplifier provide sufficient gain so that the loop power gain is unity throughout the required bandwidth, as discussed hereinbefore. Certain characteristics of the amplifier are important in securing this operation.

Figure 14:
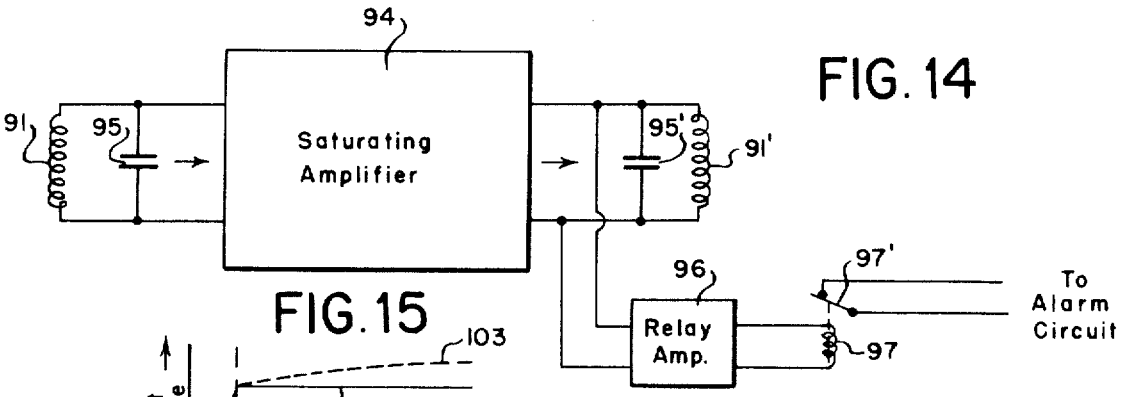
FIG. 14 is a circuit arrangement of an embodiment of the invention.

Referring to FIG. 14, a saturating amplifier 94 is shown having its input terminals connected to coil 91 of the receiving transducer, and its output connected to coil 91' of the transmitting transducer. Capacitors 95 and 95' are connected across coils 91, 91' to form respective circuits which resonate at the resonant frequency of the electromechanical elements of the transducers. This promotes efficiency of amplification without markedly reducing the overall bandwidth of the system, since the electromechanical portions of the transducers commonly have a much higher Q than the electrical portions.

In order to distinguish between oscillatory and nonoscillatory conditions, a relay amplifier 96 is connected to the output of amplifier 94 and adapted to energize relay coil 97. With no oscillations present, the output of amplifier 94 is relatively low and the current to relay coil 97 correspondingly low, thereby allowing the relay arm 97' to assume its upper position as shown. This may be used to establish an alarm circuit, or to perform any other desired control function.

When regenerative oscillations are established, the output of amplifier 94 increases, thereby increasing the current through relay coil 97, moving arm 97' to its lower position, and breaking the alarm circuit. In case of failure of amplifier 94 or 96, or interruption of the electrical or acoustic path in the loop circuit at any point, relay coil 97 will be deenergized and actuate the alarm.

Figure 15:
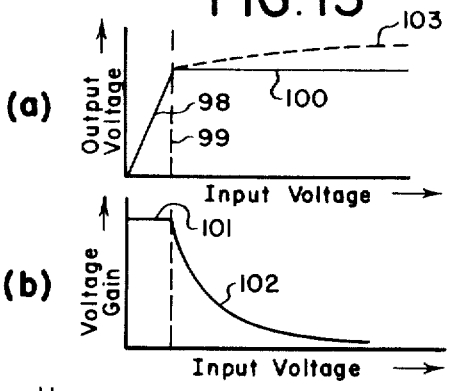
FIGS. 15 and 16 are explanatory of the design of the saturating amplifier of FIG. 14.

FIG. 15 illustrates desirable characteristics of the saturating amplifier. In FIG. 15a output voltage versus input voltage of amplifier 94 is plotted. For small input voltages the output voltage increases with input voltage, as shown by line 98. At a selected value of input voltage represented by line 99, a condition of saturation is reached, as shown at 100. Consequently, for input voltages exceeding 99, the output voltage is constant.

FIG. 15b shows the voltage gain of the amplifier as a function of input voltage. During the linear portion 98 of the voltage characteristic of FIG. 15a, the voltage gain remains approximately constant, as shown by line 101. However, when saturation is reached, the voltage gain decreases, as shown by curve 102.

A linear rise along line 98 and a flat saturation region along line 100 as shown in FIG. 15a, with corresponding constant voltage gain region 101 and decreasing gain region 102 in FIG. 15b, for convenience of explanation. It will be understood that these characteristics are somewhat idealized. A linear variation up to the point of saturation, while desirable, is not essential. Also, it is not essential that the saturation region be absolutely flat, although a well-defined saturation region is desirable. In practice, a somewhat rising characteristic, as shown by dotted line 103, will commonly be obtained.

The point at which saturation begins is selected so that sufficient output is delivered to the transmitting transducer to maintain oscillation over the contemplated range of operating conditions of the apparatus. If only short ranges are contemplated, the power output of the amplifier at saturation may be less than for greater ranges. The gain of the amplifier before saturation is reached is selected so that operation will be in the saturation region under all normal operating conditions, including both operation at the resonant frequency of the transducers and under off-resonant conditions in accordance with the bandwidth and phase requirements discussed hereinbefore.

When an interfering object is interposed in the acoustic path, the acoustic energy to the receiving transducer decreases and the amplifier changes from saturated to unsaturated regions of operation. This corresponds to the region of maximum voltage gain but, when the object sufficiently interferes with the acoustic propagation, this gain is insufficient to maintain oscillations and they cease.

Upon removal of the object, it s desirable for oscillatons to resume as quickly as possible. This is accomplished by designing the amplifier so that the noise level is only moderately below the saturation level. The noise level is primarily determined by the noise present in the input stage of the amplifier, principally thermal noise. The input noise, the amplifier gain, and the point at which saturation begins are advantageously selected so that the output noise level is not substantially less than about 12 db below the saturation level. This 12 db corresponds to a voltage ratio of 4:1. In practice, it has been found that a noise level at the output of the amplifier about 9 db below the saturation level is usually satisfactory. Then, upon removal of the interfering object, the noise delivered to the transmitting transducer is propagated to the receiving transducer and, since voltage gain is at a maximum, oscillations rapidly build up.

Figure 16:
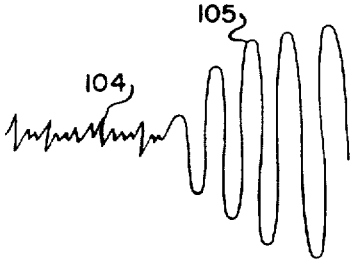

FIG. 16 illustrates the operation. Here, the output noise level in the presence of an interfering object is shown at 104. Upon removal of the object, oscillations 105 rapidly build up to an output level determined by the point of saturation.

For rapid resumption of oscillation upon removal of the object, it is desirable to have the output noise level as close to the saturation level as possible. However, the output noise level should be sufficiently below the saturation level so that the output relay or other indicating device has a sufficient margin to recognize clearly when an interfering object is in the beam path.

The saturation level may be established by various means known in the art. For example, diode clippers may be inserted between amplifier stages to limit the amplitude excursions. It is desirable that the clipping circuits be designed so that the D.-C. biases in the various stages do not change. This may be accomplished by employing back-to-back diodes to clip symmetrically in both directions. Or, if bias changes occur, the discharge time constants of the biasing circuits should be short. This is to insure that changes in operating conditions such as changes in velocity of propagation or path length, or deflections of the ultrasonic beam by wind variations, etc., will not falsely actuate the alarm or other indicating circuit.

Suppose, for example, that the apparatus is operating far into the saturation region and the D.-C. bias has changed. Then, if a change in operating conditions takes place which requires operation only slightly into the saturation region, the changed D.-C. bias may cause the amplifier to operate momentarily in its unsaturated region and cause false operation of the relay. Such false operation can be prevented either by avoiding substantial changes in D.-C. bias in the saturation region, or by providing time constants in the D.-C. bias circuits which are short compared to the changes in operating conditions.

In FIG. 14, as described, oscillations are either present or absent, and a relay or other instrumentality is employed to indicate such presence or absence. This type of operation is useful in a wide variety of applications. However, other types of indicators can be employed and it is not always necessary for oscillations to cease in order to obtain an indication. For example, if an interfering object only partially intercepts the beam, oscillations may continue due to the amplifier remaining in its saturated region, but the signal at the receiver transducer will be smaller. Consequently, in the early stages of the amplifier, prior to the saturating stages, the signal amplitude will be reduced. By suitably indicating change in signal strength at such a point, a more sensitive indication of the presence or absence of objects may be obtained, and the response will be proportional to the degree of beam interception.

Figure 17:
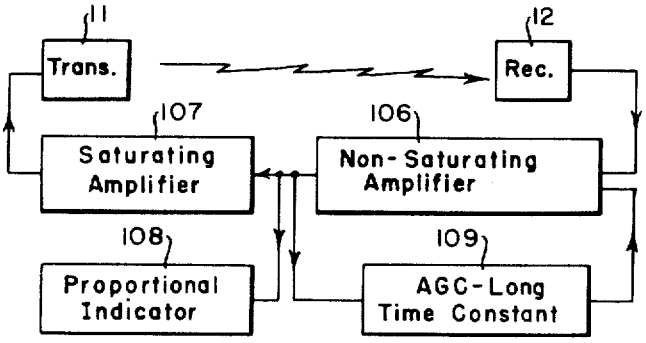
FIG. 17 shows the use of a proportional indicator and a long time constant AGC circuit.

FIG. 17 illustrates such an arrangement. Here transmitting and receiving transducers 11, 12 are arranged as in FIG. 1. However, the amplifier is shown in two sections. The output of the receiving transducer 12 is fed to a non-saturating amplifier 106. The output of this amplifier is then supplied to saturating amplifier 107. The output of the non-saturating amplifier is supplied to a proportional indicator 108 whch may take any desired form, such as a meter, recorder, etc. If, then, an object partially intercepts the accoustic beam between transmitter and receiver, the output of amplifier 106 will be reduced, giving a corresponding indication on the proportional indicator 103. When the object sufficiently intercepts the beam, oscillations will cease, and a relay or other indicating device may be connected to the output of saturating amplifier 107 to indicate cessation of oscillations.

The output of receiver transducer 12 not only will vary with the presence or absence of an interfering object, but also will vary if the acoustic absorption of the air changes, due to change of temperature, humidity, etc. Over short path lengths the change in acoustic attenuation may be inconsequential, but over long path lengths it may be significant. In most practical cases, the change will take place much more slowly than changes produced by interfering object. In order for indicator 108 to be responsive primarily to an interfering object, an automatic gain control circuit may be employed in the non-saturating amplifier 106. Such a circuit is indicated at 109 and receives the signal output of amplifier 106, rectifies the signal, and feeds the rectified signal back to the input to control the amplifier gain. The time constant of the AGC circuit should be selected to be sufficiently long so that the response to an interfering object will not be substantially impaired. However, changes in atmospheric absorption, etc., which are relatively slow, will change the gain of the amplifier 106 so that its output remains relatively constant in the absence of an interfering object. AGC time constants of one second or greater have been employed with success in particular cases.

The AGC circuit should be designed so that the output of amplifier section 106 is sufficient to drive section 107 into its saturation region for an input signal from the receiving transducer of a selected level. Above the selected level, the more constant the output of section 106, the less change in sensitivity to interfering objects. Thus it is advantageous to employ a delayed AGC circuit in which the delay bias is selected so that the output of section 106 reaches the proper level before substantial AGC action sets in. Also, amplified AGC is advantageous in order to maintain the output of section 106 constant thereafter. The design of AGC circuits per se is well-known in the art and further detail is unnecessary.

Such a long time constant AGC circuit may advantageously be inserted in the arrangement of FIG. 14, since changes in atmospheric absorption will change the point at which oscillations cease. Thus, if the amplifier gain is sufficiently high to produce oscillations under the weakest received signal conditions expected to be encountered, without the AGC circuit the apparatus will be less sensitive to interfering objects when the signal strength increases. The long time constant AGC circuit is advantageously employed to avoid such change in sensitivity.

It will be recognized that in both FIGS. 14 and 17 the indicating means is responsive to the oscillatory condition at a point in the loop. In FIG. 14 the relay amplifier is responsive to changes in the oscillatory condition from oscillation to non-oscillation, or vice versa, whereas in FIG. 14 the indicator is responsive to change in amplitude of the oscillations. If desired, the indicating means may be made responsive to other types of changes in the oscillatory condition of the loop, and the point in the loop to which the indicating means is connected may be selected accordingly.

Indicating changes in the oscillatory condition of the regenerative loop itself is particularly contemplated in the present invention. However, the features of the invention which insure reliable operation despite changes in path length or velocity of propagation may be employed also in applications where auxiliary apparatus is used for measuring or control purposes.

Instead of continuous operation, means can be employed to render the apparatus operative intermittently, if desired. For example, means can be provided to cause the apparatus to function at timed intervals, the duration of each interval being sufficient to allow regenerative oscillations to become established as described herein.

In the specific embodiments described above, the apparatus is normally in the oscillatory condition, and an object whose presence is to be detected partially or completely intercepts the acoustic beam. Many variations are possible, however. For example, it may be desired to detect whether a door is open or closed. In such case the transducers may be arranged so that a closed door reflects the beam to the receiving transducer so that an acoustic transmission path is present, but an open door does not establish such a path.

These and other modifications are possible within the spirit and scope of the invention. Inasmuch as the invention is capable of a wide variety of uses for detection or control purposes, various features of the invention may be employed as meets the requirements of a given application and the detailed design may be accommodated thereto.

What is claimed is:

1. Ultrasonic detection apparatus for detecting the presence or absence of objects which comprises:

(a) spaced ultrasonic receiving and transmitting transducers arranged so that a path therebetween is changed between acoustically transmitting and relatively nonacoustically transmitting conditions by the presence and absence in the path of objects to be detected, (b) an amplifier having input and output circuits connected with said receiving and transmitting transducers respectively to form a regenerative feedback loop including said path and produce continuous-wave oscillations in the loop when the path is in its acoustically transmitting condition, *the portion of the loop including the transducers and amplifier having a relatively narrow passband for the regenerative loop oscillations,*

(c) said continuous-wave oscillations ceasing when the path is in its relatively nonacoustically transmitting condition, (d) the noise level in the loop and the amplifier thereof when said path is changed from relatively nonacoustically transmitting to acoustically transmitting conditions being sufficient to establish continuous-wave loop oscillations promptly, (e) and indicating means connected to said amplifier to indicate the presence or absence of loop oscillations therein [.] , (f) *the amplifier gain and said narrow passband being correlated to maintain a closed loop power gain of at least unity for a frequency range at least as great as c/L when the path is in its acoustically transmitting condition, where c is the velocity of propagation of the ultrasonic energy and L is the path length between the transducers.*

[2. Apparatus in accordance with claim 1 in which the portion of the loop including the transducers and amplifier has a relatively narrow passband for the regenerative loop oscillations.]

3. Apparatus in accordance with claim 1 in which the amplifier has a substantially saturated output level for input signals exceeding a predetermined level, the output noise level of the amplifier being less than said saturated output level and greater than a level approximately 12 db below the saturated output level.

4. Apparatus in accordance with claim 1 in which the amplifier has a substantially saturated output level and the amplifier gain is predetermined to produce operation extending substantially into the saturation region when the path between the transducers is in its acoustically transmitting condition.

5. Apparatus in accordance with claim 1 in which (a) said amplifier has first and second sections connected in cascade, (b) the input of said first section and the output of said second section being connected with said receiving and transmitting transducers, respectively, (c) the output of said first section being predetermined to produce a substantially saturated output level in said second section for inputs from said receiving transducer exceeding a predetermined input level, (d) and an automatic gain control circuit having a time constant selected so that the circuit is effective for relatively slowly varying inputs and substantially ineffective for relatively rapidly varying inputs, (e) said automatic gain control circuit being connected to said first section to reduce the amplification thereof for slowly varying inputs exceeding said predetermined input level.

[6. Apparatus in accordance with claim 2 in which the amplifier gain and said narrow passband are correlated to maintain a closed loop power gain of at least unity throughout a variation of $c/L$ which produces at least two consecutive one-wavelength changes in the number of acoustic wavelengths between the transducers when the path therebetween is in its acoustically transmitting condition, where $c$ is the velocity of propagation of the ultrasonic energy and L is the path length between the transducers.]

[7. Apparatus in accordance with claim 2 in which the amplifier gain and said narrow passband are correlated to maintain a closed loop wore gain of at least unity for a frequency range at least as great as $c/L$ when the path is in its acoustically transmitting condition, where $c$ is the velocity of propagation of the ultrasonic energy and L is the path length between the transducers.]

[8. Apparatus in accordance with claim 2 in which said portion of the loop including the transducers and amplifier has a phase shift varying with frequency, said narrow passband and the amplifier gain being correlated to maintain a closed loop power gain of at least unity throughout a frequency range producing approximately a 180° change in relative phase between the acoustic input and output of the transducers.]

[9. Apparatus in accordance with claim 2 in which the propagation between the transducers includes traveling and standing waves for at least a portion of the operating range when the path is in its acoustically transmitting condition, the frequency response and phase characteristic of said narrow passband and the amplifier gain being correlated to maintain a closed loop power gain of at least unity and a closed loop phase shift of an integral multiple of $2\pi$ radians throughout a variation of $c/L$ producing at least two consecutive one-wavelength changes in the number of acoustic wavelengths between the transducers, where $c$ is the velocity of propagation of the ultrasonic energy and L is the path length between the transducers.]

[10. Apparatus in accordance with claim 2 in which the amplifier has a substantially saturated output level for inputs exceeding a predetermined input level, the narrow passband and the predetermined input level being correlated to maintain operation in the saturated region of the amplifier throughout a variation of $c/L$ which produces at least two consecutive one-wavelength changes in the number of acoustic wavelengths between the transducers when the path therebetween is in its acoustically transmitting condition, where $c$ is the velocity of propagation of the ultrasonic energy and L is the path length between the transducers.]

[11. Apparatus in accordance with claim 2 in which the amplifier has a substantially saturated output level for inputs exceeding a predetermined input level and the portion of the loop including the transducers and amplifier has a phase shift varying with frequency, said narrow passband and the predetermined input level being correlated to maintain operation in the saturated region of the amplifier throughout a frequency range corresponding to approximately a 180° change in relative phase between the acoustic input and output of the transducers.]

[12. Apparatus in accordance with claim 7 in which the] *Apparatus in accordance with claim 1 in which the* closed loop power gain is maintained at least unity for a frequency range at least as great as the maximum value of c/L in the operating range of the detection apparatus.

13. Ultrasonic detection apparatus for detecting the presence or absence of objects which comprises (a) ultrasonic receiving and transmitting transducers spaced apart in a gaseous medium and arranged so that a path therebetween in the gaseous medium is changed between acoustically transmitting and relatively non-acoustically transmitting conditions by the presence and absence in the path of objects to be detected, (b) said transducers having relatively sharp resonant characteristics, (c) an amplifier having input and output circuits connected with said receiving and transmitting transducers respectively to form a regenerative feedback loop including said path and produce continuous-wave oscillations in the loop when the path is in its acoustically transmitting condition at a frequency determined primarily by the resonant characteristics of the transducers and the acoustic transmission path therebetween, (d) said continuous-wave oscillations ceasing when the path is in its relatively non-acoustically transmitting condition, (e) the noise level in the loop and the amplification thereof when said path is changed from relatively non-acoustically transmitting to acoustically transmitting conditions being sufficient to establish continuous-wave loop oscillations promptly, (f) and indicating means connecting to said amplifier to indicate the presence or absence of loop oscillations therein,

*in which the amplifier gain and said resonant transducer characteristics are correlated to maintain a closed loop power gain of at least unity for a frequency range at least as great as c/L when the path is in its acoustically transmitting condition, where c is the velocity of propagation of the ultrasonic energy and L is the path length between the transducers.*

14. *Ultrasonic detection apparatus for detecting the presence or absence of objects which comprises*

*ultrasonic receiving and transmitting transducers spaced apart in a gaseous medium and arranged so that a path therebetween in the gaseous medium is changed between acoustically transmitting and relatively non-acoustically transmitting conditions by the presence and absence in the path of objects to be detected,*

*said transducers having relatively sharp resonant characteristics,*

*an amplifier having input and output circuits connected with said receiving and transmitting transducers respectively to form a regenerative feedback loop including said path and produce continuous-wave oscillations in the loop when the path is in its acoustically transmitting condition at a frequency determined primarily by the resonant characteristics of the transducers and the acoustic transmission path therebetween,*

*said continuous-wave oscillations ceasing when the path is in its relatively non-acoustically transmitting condition,*

*the noise level in the loop and the amplification thereof when said path is changed from relatively non-acoustically transmitting to acoustically transmitting conditions being sufficient to establish continuous-wave loop oscillations promptly,*

*and indicating means connecting to said amplifier to indicate the presence or absence of loop oscillations therein,*

[Apparatus in accordance with claim 13] in which the amplifier gain and said resonant transducer characteristics are correlated to maintain a closed loop power gain of at least unity throughout a variation of c/L which produces at least two consecutive one-wavelength changes in the number of acoustic wavelengths between the transducers when the path therebetween is in its acoustically transmitting condition, where c is the velocity of propagation of the ultrasonic energy and L is the path length between the transducers.

[15. Apparatus in accordance with claim 13 in which the amplifier gain and said resonant transducer characteristics are correlated to maintain a closed loop power gain of at least unity for a frequency range at least as great as c/L when the path is in its acoustically transmitting condition, where c is the velocity of propagation of the ultrasonic energy and L is the path length between the transducers.]

16. *Ultrasonic detection apparatus for detecting the presence or absence of objects which comprises*

*ultrasonic receiving and transmitting transducers spaced apart in a gaseous medium and arranged so that a path therebetween in the gaseous medium is changed between acoustically transmitting and relatively non-acoustically transmitting conditions by the presence and absence in the path of objects to be detected,*

*said transducers having relatively sharp resonant characteristics,*

*an amplifier having input and output circuits connected with said receiving and transmitting transducers respectively to form a regenerative feedback loop including said path and produce continuous-wave oscillations on the loop when the path is in its acoustically transmitting condition at a frequency determined primarily by the resonant characteristics of the transducers and the acoustic transmission path therebetween,*

*said continuous-wave oscillations ceasing when the path is in its relatively non-acoustically transmitting condition,*

*the noise level in the loop and the amplification thereof when said path is changed from relatively non-acoustically transmitting to acoustically transmitting conditions being sufficient to establish continuous-wave loop oscillations promptly,*

*and indicating means connecting said amplifier to indicate the presence or absence of loop oscillations therein,*

[Apparatus in accordance with claim 13] in which the bandwidth over which the closed loop power gain is at least unity when the path is in its acoustically transmitting condition is predetermined so that as the c/L ratio varies to change the number of acoustic wavelengths between the transducers the frequency range corresponding to at least two consecutive one-wavelength changes lies within said bandwidth, where c is the velocity of propagation of the ultrasonic energy and L is the path length between the transducers.

17. *Ultrasonic detection apparatus for detecting the presence or absence of objects which comprises*

*ultrasonic receiving and transmitting transducers spaced apart in a gaseous medium and arranged so that a path therebetween in the gaseous medium is changed between acoustically transmitting and relatively non-acoustically transmitting conditions by the presence and absence in the path of objects to be detected,*

*said transducers having relatively sharp resonant characteristics,*

*an amplifier having input and output circuits connected with said receiving and transmitting transducers respectively to form a regenerative feedback loop including said path and produce continuous-wave oscillations in the loop when the path is in its acoustically transmitting condition at a frequency determined primarily by the resonant characteristics of*

*the transducers and the acoustic transmission path therebetween,*

*said continuous-wave oscillations ceasing when the path is in its relatively non-acoustically transmitting condition,*

*the noise level in the loop and the amplification thereof when said path is changed from relatively non-acoustically transmitting to acoustically transmitting conditions being sufficient to establish continuous-wave loop oscillations promptly,*

*and indicating means connecting to said amplifier to indicate the presence or absence of loop oscillations therein,*

[Apparatus in accordance with claim 13] in which the resonant characteristics of the transducers and the amplifier gain are correlated to maintain a closed loop power gain of at least unity throughout a frequency range producing approximately a 180° change in relative phase between the acoustic input and output of the transducers.

18. *Ultrasonic detection apparatus for detecting the presence or absence of objects which comprises*

*ultrasonic receiving and transmitting transducers spaced apart in a gaseous medium and arranged so that a path therebetween in the gaseous medium is changed between acoustically transmitting and relatively non-acoustically transmitting conditions by the presence and absence in the path of objects to be detected,*

*said transducers having relatively sharp resonant characteristics,*

*an amplifier having input and output circuits connected with said receiving and transmitting transducers respectively to form a regenerative feedback loop including said path and produce continuous-wave oscillations in the loop when the path is in its acoustically transmitting condition at a frequency determined primarily by the resonant characteristics of the transducers and the acoustic transmission path therebetween,*

*said continuous-wave oscillations ceasing when the path is in its relatively non-acoustically transmitting condition,*

*the noise level in the loop and the amplification thereof when said path is changed from relatively non-acoustically transmitting to acoustically transmitting conditions being sufficient to establish continuous-wave loop oscillations promptly,*

*and indicating means connecting to said amplifier to indicate the presence or absence of loop oscillations therein,*

[Apparatus in accordance with claim 13] in which the propagation between the transducers includes traveling and standing waves for at least a portion of the operating range when the path is in its acoustically transmitting condition, the frequency response and phase characteristics of said resonant transducers and the amplifier gain being correlated to maintain a closed loop power gain of at least unity and a closed loop phase shift of an integral multiple of $2\pi$ radians through a variation of c/L producing at least two consecutive one-wavelength changes in the number of acoustic wavelengths between the transducers, where c is the velocity of propagation of the ultrasonic energy and L is the path length between the transducers.

19. *Ultrasonic detection apparatus for detecting the presence or absence of objects which comprises*

*ultrasonic receiving and transmitting transducers spaced apart in a gaseous medium and arranged so that a path therebetween in the gaseous medium is changed between acoustically transmitting and relatively non-acoustically transmitting conditions by the presence and absence in the path of objects to be detected,*

*said transducers having relatively sharp resonant characteristics,*

*an amplifier having input and output circuits connected with said receiving and transmitting transducers respectively to form a regenerative feedback loop including said path and produce continuous-wave oscillations in the loop when the path is in its acoustically transmitting condition at a frequency determined primarily by the resonant characteristics of the transducers and the acoustic transmission path therebetween,*

*said continuous-wave oscillations ceasing when the path is in its relatively non-acoustically transmitting condition,*

*the noise level in the loop and the amplification thereof when said path is changed from relatively non-acoustically transmitting to acoustically transmitting conditions being sufficient to establish continuous-wave loop oscillations promptly,*

*and indicating means connecting to said amplifier to indicate the presence or absence of loop oscillations therein,*

[Apparatus in accordance with claim 13] in which the amplifier has a substantially saturated output level and the amplifier gain is predetermined to produce operation extending substantially into the saturation region when the path between the transducers is in its acoustically transmitting condition.

[20. Apparatus in accordance with claim 13 in which the amplifier has a substantially saturated output level for inputs exceeding a predetermined input level, the transducer resonant characteristics and the predetermined input level being correlated to maintain operation in the saturated region of the amplifier throughout a frequency range at least as great as $c/L$ when the path between the transducers is in its acoustically transmitting condition, where $c$ is the velocity of propagation of the ultrasonic energy and L is the path length between the transducers.]

21. *Ultrasonic detection apparatus for detecting the presence or absence of objects which comprises*

*ultrasonic receiving and transmitting transducers spaced apart in a gaseous medium and arranged so that a path therebetween in the gaseous medium is changed between acoustically transmitting and relatively non-acoustically transmitting conditions by the presence and absence in the path of objects to be detected,*

*said transducers having relatively sharp resonant characteristics,*

*an amplifier having input and output circuits connected with said receiving and transmitting transducers respectively to form a regenerative feedback loop including said path and produce continuous-wave oscillations in the loop when the path is in its acoustically transmitting condition at a frequency determined primarily by the resonant characteristics of the transducers and the acoustic transmission path therebetween,*

*said continuous-wave oscillations ceasing when the path is in its relatively non-acoustically transmitting condition,*

*the noise level in the loop and the amplification thereof when said path is changed from relatively non-acoustically transmitting to acoustically transmitting conditions being sufficient to establish continuous-wave loop oscillations promptly,*

*and indicating means connecting to said amplifier to indicate the presence or absence of loop oscillations therein,*

[Apparatus in accordance with claim 13] in which the amplifier has a substantially saturated output level for inputs exceeding a predetermined input level and the portion of the loop including the transducers and amplifier has a phase shift varying with frequency, said transducer resonant characteristics and the predetermined input level being correlated to maintain operation in the saturated region of the amplifier throughout a frequency range corresponding to approximately a 180° change in relative phase between the acoustic input and output of the transducers.

22. *Ultrasonic detection apparatus for detecting the presence or absence of objects which comprises*

*ultrasonic receiving and transmitting transducers spaced apart in a gaseous medium and arranged so that a path therebetween in the gaseous medium is changed between acoustically transmitting and relatively non-acoustically transmitting conditions by the presence and absence in the path of objects to be detected,*

*said transducers having relatively sharp resonant characteristics,*

*an amplifier having input and output circuits connected with said receiving and transmitting transducers respectively to form a regenerative feedback loop including said path and produce continuous-wave oscillations in the loop when the path is in its acoustically transmitting condition at a frequency determined primarily by the resonant characteristics of the transducers and the acoustic transmission path therebetween,*

*said continuous-wave oscillations ceasing when the path is in its relatively non-acoustically transmitting condition,*

*the noise level in the loop and the amplification thereof when said path is changed from relatively non-acoustically transmitting to acoustically transmitting conditions being sufficient to establish continuous-wave loop oscillations promptly,*

*and indicating means connecting to said amplifier to indicate the presence or absence of loop oscillations therein, in which the amplifier gain and said resonant transducer characteristics are correlated to maintain a closed loop power gain of at least unity for a frequency range at least as great as c/L when the path is in its acoustically transmitting condition, where c is the velocity of propagation of the ultrasonic energy and L is the path length between the transducers, and*

[Apparatus in accordance with claim 13] in which (a) said amplifier has first and second sections connected in cascade, (b) the input of said first section and the output of said second section being connected with said receiving and transmitting transducers, respectively, (c) the output of said first section being predetermined to produce a substantially saturated output level in said second section for inputs from said receiving transducers exceeding a predetermined input level, (d) and an automatic gain control circuit having a time constant selected so that the circuit is effective for relatively slowly varying inputs and substantially ineffective for relatively rapidly varying inputs, (e) said automatic gain control circuit being connected to said first section to reduce the amplification thereof for slowly varying inputs exceeding said predetermined input level.

23. *Ultrasonic detection apparatus for detecting the presence or absence of objects which comprises*

*ultrasonic receiving and transmitting transducers spaced apart in a gaseous medium and arranged so that a path therebetween in the gaseous medium is changed between acoustically transmitting and relatively non-acoustically transmitting conditions by the presence and absence in the path of objects to be detected,*

*said transducers having relatively sharp resonant characteristics,*

*an amplifier having input and output circuits connected with said receiving and transmitting transducers respectively to form a regenerative feedback loop including said path and produce continuous-wave oscillations in the loop when the path is in its acoustically transmitting condition at a frequency determined primarily by the resonant characteristics of the transducers and the acoustic transmission path therebetween,*

*said continuous-wave oscillations ceasing when the path is in its relatively non-acoustically transmitting condition,*

*the noise level in the loop and the amplification thereof when said path is changed from relatively non-acoustically transmitting to acoustically transmitting conditions being sufficient to establish continuous-wave loop oscillations promptly,*

*and indicating means connecting to said amplifier to indicate the presence or absence of loop oscillations therein,*

*in which the amplifier gain and said resonant transducer characteristics are correlated to maintain a closed loop power gain of at least unity for a frequency range at least as great as c/L when the path is in its acoustically transmitting condition, where c is the velocity of propagation of the ultrasonic energy and L is the path length between the transducers, and* [apparatus in accordance with claim 15] in which the closed loop power gain is maintained at least unity for a frequency range at least as great as the maximum value of c/L in the operating range of the detection apparatus.

24. *Ultrasonic detection apparatus for detecting the presence or absence of objects which comprises*

*ultrasonic receiving and transmitting transducers spaced apart in a gaseous medium and arranged so that a path therebetween in the gaseous medium is changed between acoustically transmitting and relatively non-acoustically transmitting conditions by the presence and absence in the path of objects to be detected,*

*said transducers having relatively sharp resonant characteristics,*

*an amplifier having input and output circuits connected with said receiving and transmitting transducers respectively to form a regenerative feedback loop including said path and produce continuous-wave oscillations in the loop when the path is in its acoustically transmitting condition at a frequency determined primarily by the resonant characteristics of the transducers and the acoustic transmission path therebetween,*

*said continuous-wave oscillations ceasing when the path is in its relatively non-acoustically transmitting condition,*

*the noise level in the loop and the amplification thereof when said path is changed from relatively non-acoustically transmitting to acoustically transmitting conditions being sufficient to establish continuous-wave loop oscillations promptly,*

*and indicating means connecting to said amplifier to indicate the presence or absence of loop oscillations therein,*

*in which the amplifier gain and said resonant transducer characteristics are correlated to maintain a closed loop power gain of at least unity for a frequency range at least as great as c/L when the path is in its acoustically transmitting condition, where c is the velocity of propagation of the ultrasonic energy and L is the path length between the transducers, and*

[Apparatus in accordance with claim 23] in which the transducers are arranged and adapted for predominantly traveling wave propagation therebetween when the path is in its acoustically transmitting condition.

[25. Apparatus in accordance with claim 17 in which the transducers are arranged and adapted for predominantly standing wave propagation therebetween when the path is in its acoustically transmitting condition.]

26. *Ultrasonic detection apparatus for detecting the presence or absence of objects which comprises*

*ultrasonic receiving and transmitting transducers spaced apart in a gaseous medium and arranged so that a path therebetween in the gaseous medium is changed between acoustically transmitting and relatively non-acoustically transmitting conditions by the presence and absence in the path of objects to be detected,*

*said transducers having relatively sharp resonant characteristics,*

*an amplifier having input and output circuits connected with said receiving and transmitting transducers respectively to form a regenerative feedback loop including said path and produce continuous-wave oscillations in the loop when the path is in its acoustically transmitting condition at a frequency determined primarily by the resonant characteristics of the transducers and the acoustic transmission path therebetween,*

*said continuous-wave oscillations ceasing when the path is in its relatively non-acoustically transmitting condition,*

*the noise level in the loop and the amplification thereof when said path is changed from relatively non-acoustically transmitting to acoustically transmitting conditions being sufficient to establish continuous-wave loop oscillations promptly,*

*and indicating means connecting to said amplifier to indicate the presence or absence of loop oscillations therein,*

*in which the amplifier gain and said resonant transducer characteristics are correlated to maintain a closed loop power gain of at least unity for a frequency range at least as great as c/L when the path is in its acoustically transmitting condition, where c is the velocity of propagation of the ultrasonic energy and L is the path length between the transducers, and* [Apparatus in accordance with claim 20] in which the output noise level of the amplifier is less than the saturated output level and greater than a level approximately 12 db below the saturated output level.

[27. Apparatus in accordance with claim 21 in which the output noise level of the amplifier is less than the saturated output level and greater than a level approximately 12 db below the saturated output level.]

*28. Ultrasonic detection apparatus for detecting the presence or absence of objects which comprises:*

*(a) spaced ultrasonic receiving and transmitting transducers arranged so that a path therebetween is changed between acoustically transmitting and relatively nonacoustically transmitting conditions by the presence and absence in the path of objects to be detected,*

*(b) an amplifier having input and output circuits connected with said receiving and transmitting transducers respectively to form a regenerative feed back loop including said path and produce continuous-wave oscillations in the loop when the path is in its acoustically transmitting condition, the portion of the loop including the transducers and amplifier having a relatively narrow passband for the regenerative loop oscillations,*

*(c) said continuous-wave oscillations ceasing when the path is in its relatively nonacoustically transmitting condition,*

*(d) the noise level in the loop and the amplification thereof when said path is changed from relatively nonacoustically transmitting to acoustically transmitting conditions being sufficient to establish continuous-wave loop oscillations promptly,*

*(e) and indicating means connected to said amplifier to indicate the presence or absence of loop oscillations therein,*

*(f) the amplifier gain and said narrow passband being correlated to maintain a closed loop power gain of at least unity throughout a variation of c/L which produces at least two consecutive one-wavelength changes in the number of acoustic wavelengths between the transducers when the path therebetween is in its acoustically transmitting condition, where c is the velocity of propagation of the ultrasonic energy and L is the path length between the transducers.*

*29. Ultrasonic detection apparatus for detecting the presence or absence of objects which comprises:*

*(a) spaced ultrasonic receiving and transmitting transducers arranged so that a path therebetween is changed between acoustically transmitting and relatively nonacoustically transmitting conditions by the presence and absence in the path of objects to be detected,*

*(b) an amplifier having input and output circuits connected with said receiving and transmitting transducers respectively to form a regenerative feedback loop including said path and produce continuous-wave oscillations in the loop when the path is in its acoustically transmitting condition, the portion of the loop including the transducers and amplifier having a relatively narrow passband for the regenerative loop oscillations,*

*(c) said continuous-wave oscillations ceasing when the path is in its relatively nonacoustically transmitting condition,*

*(d) the noise level in the loop and the amplification thereof when said path is changed from relatively nonacoustically transmitting to acoustically transmitting conditions being sufficient to establish continuous-wave loop oscil-lations promptly,*

*(e) and indicating means connected to said amplifier to indicate the presence or absence of loop oscillations therein, in which said portion of the loop including the transducers and amplifier has a phase shift varying with frequency, said narrow passband and the amplifier gain being correlated to maintain a closed loop power gain of at least unity throughout a frequency range producing approximately a 180° change in relative phase between the acoustic input and output of the transducers.*

*30. Ultrasonic detection apparatus for detecting the presence or absence of objects which comprises:*

*(a) spaced ultrasonic receiving and transmitting transducers arranged so that a path therebetween is changed between acoustically transmitting and relatively nonacoustically transmitting conditions by the presence and absence in the path of objects to be detected,*

*(b) an amplifier having input and output circuits connected with said receiving and transmitting transducers respectively to form a regenerative feedback loop including said path and produce continuous-wave oscillations in the loop when the path is in its acoustically transmitting condition, the portion of the loop including the transducers and amplifier having a relatively narrow passband for the regenerative loop oscillations,*

*(c) said continuous-wave oscillations ceasing when the path is in its relatively nonacoustically transmitting condition,*

*(d) the noise level in the loop and the amplification thereof when said path is changed from relatively nonacoustically transmitting to acoustically transmitting conditions being sufficient to establish continuous-wave loop oscillations promptly,*

*(e) and indicating means connected to said amplifier to indicate the presence or absence of loop oscillations therein, in which the propagation between the transducers includes traveling and standing waves for at least a portion of the operating range when the path is in its acoustically transmitting condition, the frequency response and phase characteristic of said narrow passband and the amplifier gain being correlated to maintain a closed loop power gain of at least unity and a closed loop phase shift of an integral multiple of $2\pi$ radians throughout a variation of c/L producing at least two consecutive one-wavelengths changes in the number of acoustic wavelengths between the transducers, where c is the*

*velocity of propagation of the ultrasonic energy and L is the path length between the transducers.*

*31. Ultrasonic detection apparatus for detecting the presence or absence of objects which comprises:*

*(a) spaced ultrasonic receiving and transmitting transducers arranged so that a path therebetween is changed between acoustically transmitting and relatively nonacoustically transmitting conditions by the presence and absence in the path of objects to be detected,*

*(b) an amplifier having input and output circuits connected with said receiving and transmitting transducers respectively to form a regenerative feedback loop including said path and produce continuous-wave oscillations in the loop when the path is in its acoustically transmitting condition, the portion of the loop including the transducers and amplifier having a relatively narrow passband for the regenerative loop oscillations,*

*(c) said continuous-wave oscillations ceasing when the path is in its relatively nonacoustically transmitting condition,*

*(d) the noise level in the loop and the amplification thereof when said path is changed from relatively nonacoustically transmitting to acoustically transmitting conditions being sufficient to establish continuous-wave loop oscillations promptly,*

*(e) and indicating means connected to said amplifier to indicate the presence or absence of loop oscillations therein, in which the amplifier has a substantially saturated output level for inputs exceeding a predetermined input level, the narrow passband and the predetermined input level being correlated to maintain operation in the saturated region of the amplifier throughout a variation of c/L which produces at least two consecutive one-wavelength changes in the number of acoustic wavelengths between the transducers when the path therebetween is in its acoustically transmitting condition, where c is the velocity of propagation of the ultrasonic energy and L is the path length between the transducers.*

*32. Ultrasonic detection apparatus for detecting the presence or absence of objects which comprises:*

*(a) spaced ultrasonic receiving and transmitting transducers arranged so that a path therebetween is changed between acoustically transmitting and relatively nonacoustically transmitting conditions by the presence and absence in the path of objects to be detected,*

*(b) an amplifier having input and output circuits connected with said receiving and transmitting transducers respectively to form a regenerative feedback loop including said path and produce continuous-wave oscillations in the loop when the path is in its acoustically transmitting condition, the portion of the loop including the transducers and amplifier having a relatively narrow passband for the regenerative loop oscillations,*

*(c) said continuous-wave oscillations ceasing when the path is in its relatively nonacoustically transmitting condition,*

*(d) the noise level in the loop and the amplification thereof when said path is changed from relatively nonacoustically transmitting to acoustically transmitting conditions being sufficient to establish continuous-wave loop oscillations promptly,*

*(e) and indicating means connected to said amplifier to indicate the presence or absence of loop oscillations therein, in which the amplifier has a substantially saturated output level for inputs exceeding a predetermined input level and the portion of the loop including the transducers and amplifier has a phase shift varying with frequency, said narrow passband and the predetermined input level being correlated to maintain operation in the saturated region of the amplifier throughout a frequency range corresponding to approximately a 180° change in relative phase between the acoustic, input and output of the transducers.*

*33. Ultrasonic detection apparatus for detecting the presence or absence of objects which comprises:*

(a) *ultrasonic receiving and transmitting transducers spaced apart in a gaseous medium and arranged so that a path therebetween in the gaseous medium is changed between acoustically transmitting and relatively non-acoustically transmitting conditions by the presence and absence in the path of objects to be detected,*

*(b) said transducers having relatively sharp resonant characteristics,*

*(c) an amplifier having input and output circuits connected with said receiving and transmitting transducers respectively to form a regenerative feedback loop including said path and produce continuous-wave oscillations in the loop when the path is in its acoustically transmitting condition at a frequency determined primarily by the resonant characteristics of the transducers and the acoustic transmission path therebetween,*

*(d) said continuous-wave oscillations ceasing when the path is in its relatively non-acoustically transmitting condition,*

*(e) the noise level in the loop and the amplification thereof when said path is changed from relatively non-acoustically transmitting to acoustically transmitting conditions being sufficient to establish continuous wave loop oscillations promptly,*

*(f) and indicating means connected to said amplifier to indicate the presence or absence of loop oscillations therein, in which the amplifier gain and said resonant transducer characteristics are correlated to maintain a closed loop power gain of at least unity throughout a frequency range which is at least as great as the frequency range in which the number of acoustic wavelengths between the transducers change from (m−1) through m to (m+1) as c/L changes when the path is in its acoustically transmitting condition, where m is a number of wavelengths within the normal c/L operating range of the apparatus, c is the velocity of propagation of the ultrasonic energy and L is the path length between the transducers.*

References Cited

The following references, cited by the Examiner, are of record in the patented file of this patent or the original patent.

UNITED STATES PATENTS

| | | | |
|---|---|---|---|
| 3,031,644 | 4/1962 | Hisserich et al. | 340—3 R |
| 2,038,878 | 4/1936 | Strutt. | |
| 2,083,344 | 6/1937 | Newhouse et al. | |
| 2,400,309 | 5/1946 | Kock. | |
| 2,749,537 | 6/1956 | Loudon. | |
| 2,782,405 | 2/1957 | Weisz et al. | |
| 2,903,683 | 9/1959 | Bagno. | |

RICHARD A. FARLEY, Primary Examiner

U.S. Cl. X.R.

340—16 R, 258 B